United States Patent
Nishikibe et al.

(10) Patent No.: US 9,790,727 B2
(45) Date of Patent: Oct. 17, 2017

(54) VEHICLE OPENING/CLOSING BODY CONTROL DEVICE AND OPENING/CLOSING SYSTEM FOR VEHICLE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Takeshi Nishikibe, Tokai (JP); Kohei Kobayashi, Ichinomiya (JP); Yoshinori Hitomi, Okazaki (JP); Takeshi Katsuda, Nagoya (JP); Shunsuke Hayakawa, Obu (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/914,551

(22) PCT Filed: Aug. 27, 2014

(86) PCT No.: PCT/JP2014/072406
§ 371 (c)(1),
(2) Date: Feb. 25, 2016

(87) PCT Pub. No.: WO2015/030044
PCT Pub. Date: Mar. 5, 2015

(65) Prior Publication Data
US 2016/0208538 A1    Jul. 21, 2016

(30) Foreign Application Priority Data

Aug. 30, 2013  (JP) ................................ 2013-179488
Aug. 30, 2013  (JP) ................................ 2013-179489
Aug. 30, 2013  (JP) ................................ 2013-179491

(51) Int. Cl.
*E05F 11/00*     (2006.01)
*E05F 15/40*     (2015.01)
(Continued)

(52) U.S. Cl.
CPC ............... *E05F 15/40* (2015.01); *B60J 5/047* (2013.01); *E05F 15/42* (2015.01); *E05F 15/44* (2015.01);
(Continued)

(58) Field of Classification Search
CPC ......... E05F 15/632; E05F 15/44; E05F 15/42; E05F 15/40; B60J 5/047; E05Y 2900/531
(Continued)

(56) References Cited

U.S. PATENT DOCUMENTS 5,350,986 A * 9/1994 Long .................... B60J 5/047
                                                    318/266
6,037,727 A    3/2000 Kawanobe et al.
(Continued)

FOREIGN PATENT DOCUMENTS

JP    2003-278445 A    10/2003
JP    2004-270142 A     9/2004
(Continued)

OTHER PUBLICATIONS

Combined Office Action and Search Report issued Sep. 2, 2016 in Chinese Patent Application No. 201480046950.6 (with English language translation).
(Continued)

*Primary Examiner* — Jerry Redman
(74) *Attorney, Agent, or Firm* — Oblon, McClelland, Maier & Neustadt, L.L.P.

(57) ABSTRACT

A vehicle opening and closing body control device includes an opening and closing drive device and a controller. When
(Continued)

the opening and closing body is being closed, in a case where the position of the opening and closing body when a trapping of a foreign object is detected is outside a specified range between a fully closed position and a specified position, the controller controls the operation of the opening and closing drive device to reverse the opening and closing body to perform the opening operation by a predetermined opening-and-returning distance and then stop the opening and closing body. In a case where the position of trapping is in the specified range, the controller reverses the opening and closing body to perform the opening operation by the predetermined opening-and-returning distance or a greater distance and then stop the opening and closing body outside the specified range.

15 Claims, 13 Drawing Sheets

(51) Int. Cl.
  *E05F 15/632* (2015.01)
  *E05F 15/42* (2015.01)
  *E05F 15/44* (2015.01)
  *B60J 5/04* (2006.01)
(52) U.S. Cl.
  CPC ....... *E05F 15/632* (2015.01); *E05Y 2900/531* (2013.01)
(58) Field of Classification Search
  USPC .......................................................... 49/360
  See application file for complete search history.

(56) References Cited

U.S. PATENT DOCUMENTS

| | | | | |
|---|---|---|---|---|
| 7,178,854 | B2* | 2/2007 | Ichinose | B60J 5/06 296/146.2 |
| 7,288,907 | B2* | 10/2007 | Kamiya | B60J 5/06 296/146.2 |
| 2006/0137136 | A1* | 6/2006 | Imai | B60J 5/06 16/52 |
| 2006/0168891 | A1* | 8/2006 | Aoyama | E05F 15/632 49/360 |
| 2007/0107313 | A1 | 5/2007 | Suzuki et al. | |
| 2007/0266635 | A1* | 11/2007 | Sugiura | E05F 15/632 49/27 |
| 2009/0229183 | A1* | 9/2009 | Kamiya | E05F 15/44 49/28 |
| 2012/0323370 | A1 | 12/2012 | Nishikibe et al. | |
| 2014/0039766 | A1 | 2/2014 | Miyake et al. | |
| 2014/0245666 | A1 | 9/2014 | Ishida et al. | |
| 2014/0365080 | A1* | 12/2014 | Hirota | E05B 81/76 701/49 |
| 2015/0020450 | A1* | 1/2015 | Shibayama | E05B 83/40 49/31 |
| 2015/0057895 | A1* | 2/2015 | Yamada | E05F 15/659 701/49 |
| 2016/0201377 | A1* | 7/2016 | Nishikibe | E05F 15/41 49/28 |
| 2016/0208538 | A1* | 7/2016 | Nishikibe | E05F 15/632 |
| 2016/0237733 | A1* | 8/2016 | Henseleit | B60J 5/047 |

FOREIGN PATENT DOCUMENTS

| | | |
|---|---|---|
| JP | 2006-22512 A | 1/2006 |
| JP | 2006-77407 A | 3/2006 |
| JP | 2007-138444 A | 6/2007 |
| JP | 2012-36569 A | 2/2012 |
| JP | 2012-219469 A | 11/2012 |
| JP | 2013-2110 A | 1/2013 |
| JP | 2013-92019 A | 5/2013 |
| WO | WO 2013/061706 A1 | 5/2013 |

OTHER PUBLICATIONS

"Mazda MPV New Model Handbook", Mazda Motor Corporation, Total 5 Pages. (Jan. 2008) (with Partial English Translation).
International Search Report Issued Oct. 21, 2014 in PCT/JP14/072406 Filed Aug. 27, 2014.
International Preliminary Report on Patentability issued Jan. 5, 2016 in PCT/JP2014/072406 filed Aug. 27, 2014 (submitting English translation only).

* cited by examiner

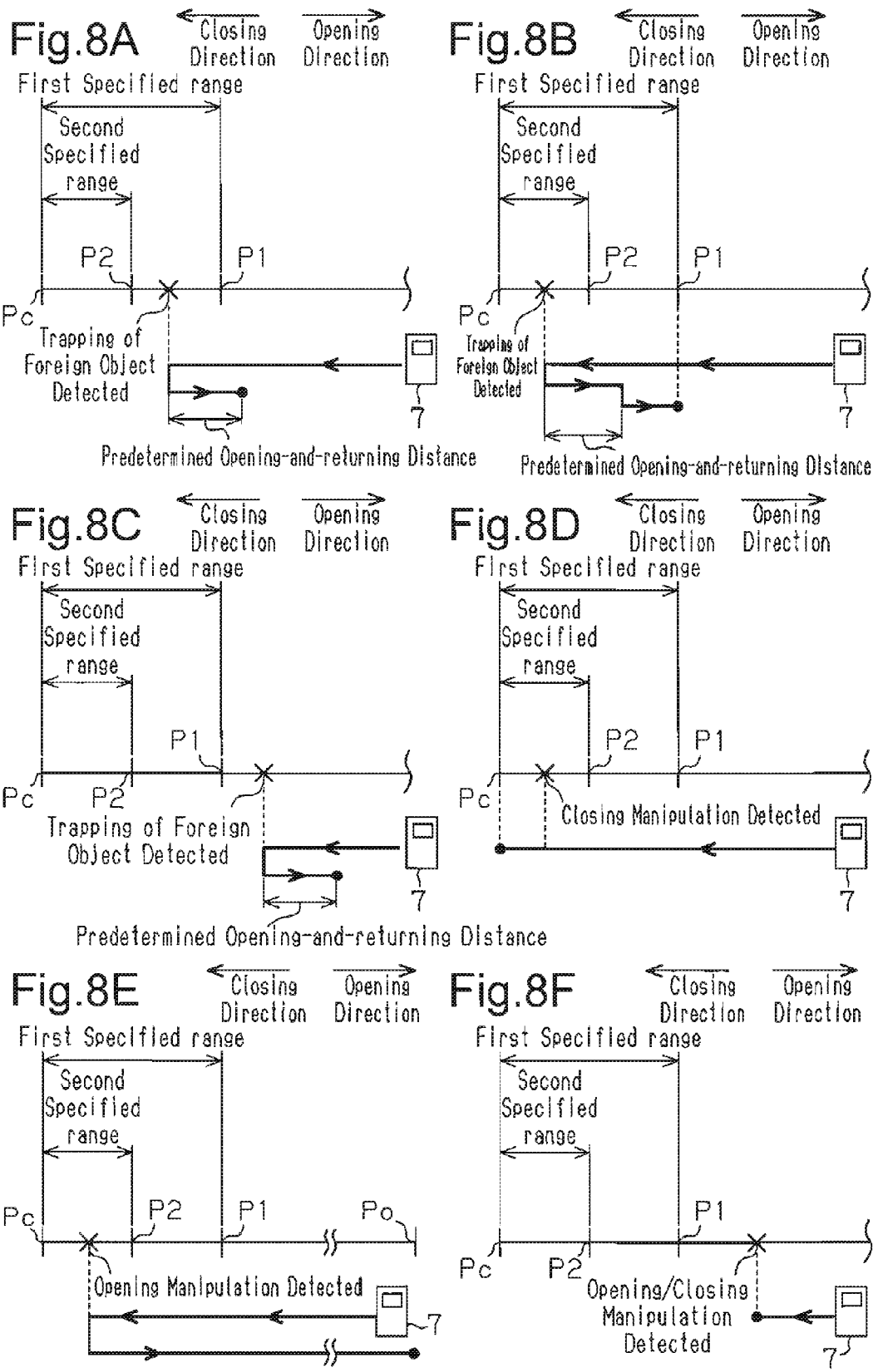

VEHICLE OPENING/CLOSING BODY CONTROL DEVICE AND OPENING/CLOSING SYSTEM FOR VEHICLE

TECHNICAL FIELD

The present invention relates to a vehicle opening/closing body control device and an opening/closing system for a vehicle.

BACKGROUND ART

Conventionally, some vehicles include a vehicle opening/closing body control device that controls the operation of an opening/closing drive device to open/close an opening/closing body such as a slide door. The vehicle opening/closing body control device may have a function of detecting a foreign object trapped by the opening/closing body when the opening/closing drive device is driven to open/close the opening/closing body. As methods of detecting trapping of a foreign object, a method based on change in an electric current supplied to a motor, which is a drive source of the opening/closing drive device, or change in the speed of the opening/closing body (for example, Patent Document 1) and a method using a touch sensor (a pressure sensor) or the like (for example, Patent Document 2) are known. When trapping of a foreign object is detected, the opening/closing body is reversed to move off the trapped foreign object.

In recent years, it has been proposed that, when trapping of a foreign object is detected, the opening/closing body is reversed before being moved by a predetermined distance and then stopped at an intermediate position in the operation range (Paragraph [0040] of Patent Document 1 and Non-Patent Document 1). This restrains re-trapping of the same foreign object by the opening/closing body after the opening/closing body is reversed.

PRIOR ART DOCUMENTS

Patent Documents

Patent Document 1: Japanese Laid-Open Patent Publication No. 2013-2110
Patent Document 2: Japanese Laid-Open Patent Publication No. 2013-92019

Non-Patent Document

Non-Patent Document 1: "MAZDA MPV New Model Handbook", MAZDA Motor Corporation, January, 2008

SUMMARY OF THE INVENTION

Problems that the Invention is to Solve

In the above-described conventional technique, when trapping of a foreign object is detected and thus the opening/closing body is reversed and moved by the predetermined distance, the opening/closing body may be stopped in the vicinity of a fully closed position. In this case, since the opening/closing body almost closes the corresponding opening of the vehicle body, the user may falsely perceive that the opening/closing body is located at the fully closed position. As a result, the user may start the vehicle or leave the vehicle with the opening/closing body located at a position other than the fully closed position, or, in other words, with the opening/closing body insufficiently held by a fully closing lock (a latch mechanism). Accordingly, improvement is demanded to solve this problem.

Accordingly, it is an objective of the present invention to provide a vehicle opening/closing body control device and a vehicle opening/closing system configured to reduce false perceptions by the user that an opening/closing body is located at a fully closed position.

Means for Solving the Problems

To achieve the foregoing objective and in accordance with one aspect of the present invention, a vehicle opening/closing body control device is provided that includes an opening/closing drive device, which performs opening/closing operation of an opening/closing body of a vehicle, an opening/closing body position detector, which detects a position of the opening/closing body, a trapping detector, which detects a trapping of a foreign object by the opening/closing body, and a controller, which controls operation of the opening/closing drive device. When the opening/closing body is being closed, if the position of the opening/closing body when the trapping of the foreign object is detected is outside a specified range between a fully closed position and a specified position, which is shifted in an opening direction from the fully closed position, the controller controls the operation of the opening/closing drive device to reverse the opening/closing body to perform the opening operation by a predetermined opening-and-returning distance and then stop the opening/closing body. When the opening/closing body is being closed, if the position of the opening/closing body when the trapping of the foreign object is detected is in the specified range, the controller controls the operation of the opening/closing drive device to reverse the opening/closing body to perform the opening operation by the predetermined opening-and-returning distance or a greater distance and then stop the opening/closing body outside the specified range.

In the above-described configuration, if trapping of a foreign object is detected when the opening/closing body is being closed and is located outside the specified range, the opening/closing body is opened by the predetermined opening-and-returning distance and then the opening/closing body is stopped. This cancels the trapping of the foreign object and restrains re-trapping of the same foreign object by the opening/closing body after the opening/closing body is reversed. If trapping of a foreign object is detected when the opening/closing body is being closed and is located in the specified range, such as when the opening/closing body is moved to a position in the vicinity of the fully closed position through the closing operation, the opening/closing body is opened by at least the predetermined opening-and-returning distance or a greater distance and then the opening/closing body is stopped outside the specified range. This cancels the trapping of the foreign object and ensures a sufficient opening amount of the opening/closing body, thus reducing false perception by the user that the opening/closing body is located at the fully closed position.

The above described vehicle opening/closing body control device preferably includes a fully opening lock, which holds the opening/closing body at a fully open position. When the opening/closing body is being opened, if it is determined that the opening/closing body enters a stopped state in a fully open range between the fully open position and an assumed fully open position, which is shifted in the closing direction from the fully open position, the controller stops the opening/closing operation of the opening/closing body by the opening/closing drive device. When the opening/closing body is being opened, if the opening/closing body moves in the closing direction from inside the fully open range and passes the assumed fully open position, the controller drives the opening/closing drive device to perform the closing operation of the opening/closing body. When the opening/closing body is being closed, if the position of the opening/closing body when the trapping of the foreign object is detected is in a reverse prohibiting range between the fully open position and a reverse prohibiting position, which is shifted in the closing direction from the assumed fully open position, the controller controls the operation of the opening/closing drive device to prevent the opening/closing body from being reversed and performing the opening operation.

In the above-described configuration, if the opening/closing body is being closed and the position of the opening/closing body when the trapping of the foreign object is detected is in the reverse prohibiting range, the opening/closing body is not reversed for the opening operation. This restrains return of the opening/closing body into the fully open range due to the trapping of the foreign object. As a result, the occurrences of trapping of a foreign object with the opening/closing body held incompletely by the fully opening lock are reduced. Also, consecutive repetition of the closing operation and the opening operation is restrained.

The above described vehicle opening/closing body control device preferably includes a fully opening lock, which holds the opening/closing body at a fully open position, and an engagement/disengagement mechanism arranged in the opening/closing drive device to selectively engage and disengage drive power transmission between a motor serving as a drive source of the opening/closing drive device and the opening/closing body. If a trapping of a foreign object is detected when the opening/closing body moves in the closing direction without drive power supplied to the motor from a state in which the opening/closing body is stopped at an intermediate position in an operation range of the opening/closing body with the engagement/disengagement mechanism in an engaged state, in which the power drive transmission between the motor and the opening/closing body is permitted, the controller controls the operation of the opening/closing drive device to move the opening/closing body to the fully open position.

In the above-described configuration, if trapping of a foreign object is detected when the opening/closing body moves in the closing direction in a state in which no drive power is supplied to the motor due to a factor such as the weight of the opening/closing body, the opening/closing body is moved to the fully open position. This cancels the trapping of the foreign object and, by holding the opening/closing body at the fully open position using the fully opening lock, restrains the occurrence of trapping of a foreign object caused by re-movement of the opening/closing body in the closing direction due to a factor such as the weight of the opening/closing body.

The above described vehicle opening/closing body control device is preferably configured such that, when the opening/closing body is being opened, if the position of the opening/closing body when the trapping of the foreign object is detected is outside the specified range, the controller controls the operation of the opening/closing drive device to reverse the opening/closing body to perform the closing operation by a predetermined closing-and-returning distance and then stop the opening/closing body. When the opening/closing body is being opened, if the position of the opening/closing body when the trapping of the foreign object is detected is in the specified range, the controller controls the operation of the opening/closing drive device to reverse and move the opening/closing body to the fully closed position.

In the above-described configuration, if trapping of a foreign object is detected when the opening/closing body is being opened and is located outside the specified range, the closing operation of the opening/closing body is performed by the predetermined closing-and-returning distance and then the opening/closing body is stopped. This cancels the trapping of the foreign object and restrains re-trapping of the same foreign object by the opening/closing body after the opening/closing body is reversed. If trapping of a foreign object is detected when the opening/closing body is being opened and is located in the specified range, such as immediately after the opening/closing body is opened from the fully closed position, the opening/closing body is returned to the fully closed position without being stopped in the vicinity of the fully closed position. This reduces false perceptions by the user that the opening/closing body is located at the fully closed position, when the opening/closing body is not actually located at the fully closed position.

The above described vehicle opening/closing body control device preferably includes an opening/closing manipulation detector, which detects an opening/closing manipulation for driving the opening/closing drive device to perform the opening/closing operation of the opening/closing body. When the opening/closing body is being opened or closed, if the position of the opening/closing body when the opening/closing manipulation is detected is outside a second specified range between the fully closed position and a second specified position, which is shifted in the closing direction from the specified position, the controller controls the operation of the opening/closing drive device to stop the opening/closing body at an intermediate position in an operation range of the opening/closing body. When the opening/closing body is being opened or closed, if the position of the opening/closing body when the opening/closing manipulation is detected is in the second specified range, the controller controls the operation of the opening/closing drive device not to stop the opening/closing body at the position of the opening/closing body.

In the above-described configuration, if an opening/closing manipulation is detected when the opening/closing body is being opened or closed and is located outside the second specified range, the opening/closing body is stopped at an intermediate position in the operation range. In the configuration, even if an opening/closing manipulation is detected when the opening/closing body is located in the second specified range, the opening/closing body is not stopped at the position of the opening/closing body when the opening/closing manipulation is detected. This restrains the opening/closing body from being stopped in the vicinity of the fully closed position, thus reducing false perceptions by the user that the opening/closing body is located at the fully closed position.

The above described vehicle opening/closing body control device is preferably configured such that, when the opening/closing body is being opened, the controller controls the operation of the opening/closing drive device to continue the opening operation of the opening/closing body if the position of the opening/closing body when the opening/closing manipulation is detected is in the second specified range.

In the above-described configuration, if an opening/closing manipulation is detected when the opening/closing body is being opened and is located in the second specified range, the opening operation of the opening/closing body is continued. This sufficiently restrains the opening/closing body from being stopped in the vicinity of the fully closed position.

The above described vehicle opening/closing body control device is preferably configured such that, when the opening/closing body is being closed, if the position of the opening/closing body when the opening/closing manipulation for performing the opening operation of the opening/closing body is detected is in the second specified range, the controller controls the operation of the opening/closing drive device to reverse the opening/closing body to perform the opening operation. When the opening/closing body is being closed, if the position of the opening/closing body when the opening/closing manipulation for performing the closing operation of the opening/closing body is in the second specified range, the controller controls the operation of the opening/closing drive device to continue the closing operation of the opening/closing body.

In the above-described configuration, if an opening/closing manipulation (closing manipulation) is detected when the opening/closing body is being closed and is located in the second specified range, the closing operation of the opening/closing body is continued. In contrast, if an opening/closing manipulation (opening manipulation) is detected when the opening/closing body is being closed and is located in the second specified range, the opening/closing body is reversed to perform the opening operation. This sufficiently restrains the opening/closing body from being stopped in the vicinity of the fully closed position.

To achieve the foregoing objective and In accordance with a second aspect of the present invention, a vehicle opening/closing body control device is provided that includes an opening/closing drive device, which performs an opening/closing operation of an opening/closing body of a vehicle, a fully opening lock, which holds the opening/closing body at a fully open position, an opening/closing body position detector, which detects a position of the opening/closing body, a trapping detector, which detects a trapping of a foreign object by the opening/closing body, and a controller. When the opening/closing body is being opened, if it is determined that the opening/closing body enters a stopped state in a fully open range between the fully open position and an assumed fully open position, which is shifted in the closing direction from the fully open position, the controller stops the opening/closing operation of the opening/closing body by the opening/closing drive device. When the opening/closing body is being opened, if the opening/closing body moves in the closing direction from inside the fully open range and passes the assumed fully open position, the controller drives the opening/closing drive device to perform the closing operation of the opening/closing body. When the opening/closing body is being closed, if the position of the opening/closing body when the trapping of the foreign object is detected is in a reverse prohibiting range between the fully open position and a reverse prohibiting position, which is shifted in the closing direction from the assumed fully open position, the controller controls the operation of the opening/closing drive device to prevent the opening/closing body from being reversed and performing the opening operation.

In the above-described configuration, if the opening/closing body is being closed and the position of the opening/closing body when the trapping of the foreign object is detected is in the reverse prohibiting range, the opening/closing body is not reversed to perform the opening operation. This restrains return of the opening/closing body into the fully open range due to the trapping of the foreign object. As a result, the occurrences of trapping of a foreign object with the opening/closing body held incompletely by the fully opening lock are reduced. Also, consecutive repetition of the closing operation and the opening operation is restrained.

The above described vehicle opening/closing body control device is preferably configured such that, when the opening/closing body is being closed, if the position of the opening/closing body when the trapping of the foreign object is detected is outside the reverse prohibiting range, the controller controls the operation of the opening/closing drive device to reverse the opening/closing body to perform the opening operation by a predetermined opening-and-returning distance and then stop the opening/closing body. The reverse prohibiting position is set at a position spaced from the assumed fully open position by a distance greater than the predetermined opening-and-returning distance in the closing direction.

In the above-described configuration, if the position of the opening/closing body when the trapping of the foreign object is outside the reverse prohibiting range, the opening operation is performed by the predetermined opening-and-returning distance and then the opening/closing body is stopped. This cancels the trapping of the foreign object and restrains re-trapping of the same foreign object by the opening/closing body after the opening/closing body is reversed. In the configuration, the reverse prohibiting position is set at a position spaced from the assumed fully open position by a distance greater than the predetermined opening-and-returning distance in the closing direction. Therefore, if the position of the opening/closing body when the trapping of the foreign object is detected is such a position that the opening operation by the predetermined opening-and-returning distance returns the opening/closing body into the fully open range, the opening operation of the opening/closing body is not performed. This sufficiently restrains return of the opening/closing body into the fully open range, which is caused by reversing the opening/closing body and performing the opening operation in response to the trapping of the foreign object. As a result, repeated occurrences of trapping of a foreign object with the opening/closing body held incompletely by the fully opening lock are effectively reduced. Also, consecutive repetition of the closing operation and the opening operation of the opening/closing body is effectively restrained.

The above described vehicle opening/closing body control device is preferably configured such that an engagement/disengagement mechanism, which selectively engages and disengages drive power transmission between a motor serving as a drive source of the opening/closing drive device and the opening/closing body, is arranged in the opening/closing drive device. When the opening/closing body is being closed, if the position of the opening/closing body when the trapping of the foreign object is detected is in the reverse prohibiting range, the controller stops the opening/closing operation of the opening/closing body by the opening/closing drive device and intermittently switches the engagement/disengagement mechanism to a disengaged state, in which the drive power transmission between the motor and the opening/closing body is disengaged.

In the above-described configuration, the engagement/disengagement mechanism is intermittently switched to the disengaged state. This allows the user to gradually move the opening/closing body manually in the closing direction without applying great force, thus facilitating release of the foreign object.

To achieve the foregoing objective and in accordance with a third aspect of the present invention, a vehicle opening/closing body control device is provided that includes an opening/closing drive device, which performs an opening/closing operation of an opening/closing body of a vehicle, a fully opening lock, which holds the opening/closing body at a fully open position, an opening/closing body position detector, which detects a position of the opening/closing body, a trapping detector, which detects a trapping of a foreign object by the opening/closing body, an engagement/disengagement mechanism arranged in the opening/closing drive device to selectively engage and disengage drive power transmission between a motor serving as a drive source of the opening/closing drive device and the opening/closing body, and a controller, which controls operation of the opening/closing drive device. If a trapping of a foreign object is detected when the opening/closing body moves in the closing direction without drive power supplied to the motor from a state in which the opening/closing body is stopped at an intermediate position in an operation range of the opening/closing body with the engagement/disengagement mechanism in an engaged state, in which the power drive transmission between the motor and the opening/closing body is permitted, the controller controls the operation of the opening/closing drive device to move the opening/closing body to the fully open position.

In the above-described configuration, if trapping of a foreign object is detected when the opening/closing body moves in the closing direction in a state in which no drive power is supplied to the motor due to a factor such as the weight of the opening/closing body, the opening/closing body is moved to the fully open position. This cancels the trapping of the foreign object and restrains, by holding the opening/closing body at the fully open position using the fully opening lock, the occurrence of trapping of a foreign object caused by re-movement of the opening/closing body in the closing direction due to a factor such as the weight of the opening/closing body.

The above described vehicle opening/closing body control device is preferably configured such that, if the trapping of the foreign object is detected when the opening/closing drive device is driven to perform the closing operation of the opening/closing body, the controller controls the operation of the opening/closing drive device to reverse the opening/closing body to perform the opening operation by a predetermined opening-and-returning distance and then stop the opening/closing body.

In the above-described configuration, if trapping of a foreign object is detected when the opening/closing body is being closed, the opening/closing body is reversed to perform the opening operation. This cancels the trapping of the foreign object and restricts the movement amount of the opening/closing body in the opening direction, thus restraining re-trapping of the same foreign object by the opening/closing body when the opening/closing body is reversed to perform the opening operation.

The above described vehicle opening/closing body control device is preferably configured such that, the trapping detector includes a touch sensor, which outputs a detection signal corresponding to contact pressure and a speed detector, which detects an operation velocity of the opening/closing body. When the opening/closing body moves in the closing direction in a state in which no drive power is supplied to the motor from the stopped state at the intermediate position, if the trapping of the foreign object is detected based on the detection signal, the controller controls the operation of the opening/closing drive device to move the opening/closing body to the fully open position. When the opening/closing body moves in the closing direction in a state in which no drive power is supplied to the motor from the stopped state at the intermediate position, if the trapping of the foreign object is detected based on the operation velocity, the controller maintains the state in which no drive power is supplied to the motor.

In many cases in which trapping of a foreign object is detected based on the detection signal of the touch sensor, the user may physically contact the opening/closing body (the touch sensor) inadvertently without noticing that the opening/closing body is moving. Therefore, for a case in which trapping of a foreign object is detected based on the detection signal, it is preferable to restrain repeated movement of the opening/closing body in the closing direction by moving the opening/closing body to the fully open position and holding the opening/closing body using the fully opening lock. In contrast, in cases in which trapping of a foreign object is detected based on the operation velocity, the user may notice that the opening/closing body is moving in the closing direction due to a factor such as the weight of the opening/closing body and manually stop the opening/closing body. Therefore, for a case in which trapping of a foreign object is detected based on the operation velocity, discomfort for the user is reduced by maintaining the motor in the state in which no drive power is supplied and prohibiting the opening/closing body from moving. As a result, in the above-described configuration, the opening/closing body is moved to the fully open position appropriately when such movement is highly needed, thus improving usability effectively.

The above described vehicle opening/closing body control device is preferably configured such that, when the opening/closing body moves in the closing direction from the stopped state at the intermediate position in the state in which no drive power is supplied to the motor, the controller changes a detection condition for detecting a trapping of an object based on the detection signal such that a detection result that a foreign object is trapped is obtained easily compared to a case in which the opening/closing drive device is driven to perform the closing operation of the opening/closing body.

When the opening/closing body moves in the closing direction in a state in which no drive power is supplied to the motor due to a factor such as the weight of the opening/closing body, the holding force produced by the holding torque of the motor acts to brake the opening/closing body. The operation velocity of the opening/closing body thus becomes comparatively small. Therefore, the contact pressure applied to the touch sensor by the foreign object also tends to be small. As a result, if the opening/closing body moves in a state in which no drive power is supplied to the motor in the closing direction from the stopped state at the intermediate position, as in the above-described configuration, trapping of a foreign object is detected with high accuracy by relaxing the detection condition for detecting trapping of a foreign object based on the detection signal of the touch sensor.

To achieve the foregoing objective, a vehicle opening/closing system in accordance with a fourth aspect of the present invention includes the vehicle opening/closing body control device according to any of the above configurations.

The above-described configuration reduces false perceptions by the user that the opening/closing body is located at the fully closed position.

Effect of the Invention

According to the present invention, false perceptions by the user that the opening/closing body is located at the fully closed position are reduced.

BRIEF DESCRIPTION OF THE DRAWINGS

FIGS. 8A, 8B, 8C, 8D, 8E, and 8F are diagrams each illustrating behavior of the slide door at the time of the closing operation control of the first embodiment;

MODES FOR CARRYING OUT THE INVENTION

First Embodiment

Hereinafter, a vehicle opening/closing body control device according to a first embodiment will be described with reference to the drawings.

Figure 1:
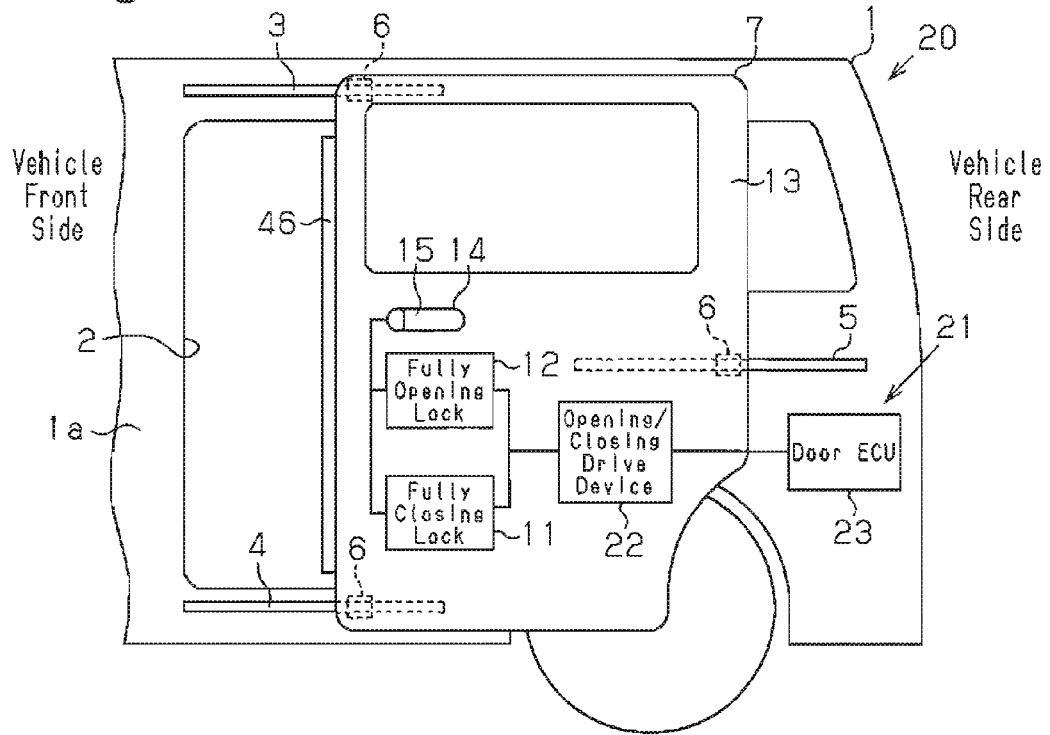
FIG. 1 is a schematic diagram illustrating the configuration of a power slide door device.

As shown in FIG. 1, a door opening 2 serving as an opening is provided in a side section of a vehicle body 1. An upper rail 3 and a lower rail 4 are arranged at an upper edge and a lower edge, respectively, of the door opening 2 and extended each in the vehicle front-back direction. A central rail 5 is arranged on the vehicle rear side (the right side as viewed in FIG. 1) with respect to the door opening 2 in the side section of the vehicle body 1 and extended in the vehicle front-back direction. In the first embodiment, the rails 3 to 5 have sections each curved toward the interior of the vehicle on the side closer to the vehicle front end. A slide door 7 serving as an opening/closing body is supported by the rails 3 to 5 with rollers 6 in a manner movable in the vehicle front-back direction. By moving in the vehicle front-back direction, the slide door 7 selectively opens and closes the door opening 2. Specifically, by moving toward the vehicle front side (the left side as viewed in FIG. 1), or, in other words, in the closing direction, the slide door 7 switches the door opening 2 to a closed state, in which the door opening 2 is closed. By moving toward the vehicle rear side, or, in other words, in an opening direction, the slide door 7 switches the door opening 2 to an open state, which allows the user to exit/enter the vehicle.

A fully closing lock (a latch mechanism) 11, which holds the slide door 7 at a fully closed position Pc, at which the door opening 2 is in the closed state, is arranged in the slide door 7. The fully closing lock 11 of the first embodiment has a known configuration that holds the slide door 7 at the fully closed position Pc by retracting a latch (not shown) into a striker (not shown). A fully opening lock 12, which holds the slide door 7 at a fully open position Po, at which the door opening 2 is in the open state, is also arranged in the slide door 7. The fully opening lock 12 of the first embodiment has a known configuration in which a hook (not shown) is selectively engaged with and disengaged from an engagement pin (not shown) provided in the vehicle body 1 to hold the slide door 7 at the fully open position Po.

A door handle 14, which is manipulated to selectively open and close the slide door 7, is arranged in an outer panel 13 configuring the outer surface (ornamental surface) of the slide door 7. A movable hand grip 15 is arranged in the door handle 14. The hand grip 15 of the first embodiment has a known configuration in which the hand grip 15 is manipulated toward the vehicle rear side to raise an end section of the hand grip 15 corresponding to the vehicle front side. The door handle 14 is mechanically connected to the fully closing lock 11 and the fully opening lock 12 each through a transmission member such as a wire. This transmits manipulation of the door handle 14 to the fully closing lock 11 and the fully opening lock 12 in correspondence with operation of the hand grip 15, which configures a grip portion of the door handle 14. Another door handle (not shown) is arranged also in the inner panel (not shown), which configures the inner surface of the slide door 7.

The slide door 7, which is configured as described above, is permitted to move in the opening direction from the fully closed position Pc and in the closing direction from the fully open position Po when the slide door 7 is released from the fully closing lock 11 and the fully opening lock 12, respectively, based on manipulation of the door handle 14 by the user.

Figure 2:
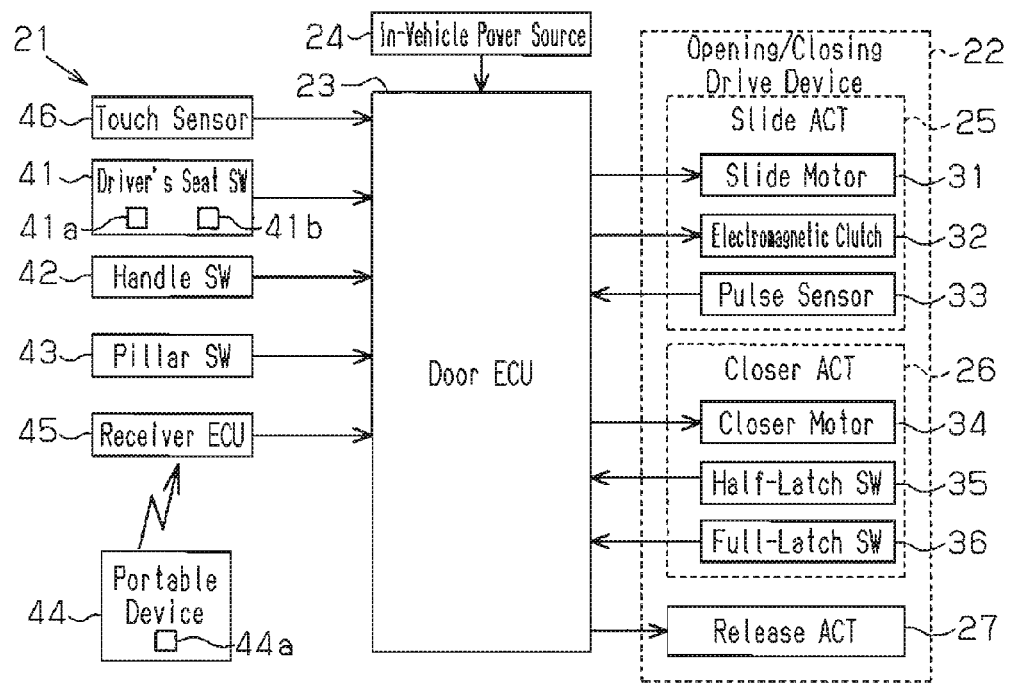
FIG. 2 is a block diagram illustrating the power slide door device.

With reference to FIGS. 1 and 2, the vehicle also has a power slide door device 21 serving as a vehicle opening/closing body control device. The power slide door device 21 and the slide door 7 configure a vehicle opening/closing system 20. The power slide door device 21 has an opening/closing drive device 22, which opens/closes the slide door 7 and a door ECU 23 serving as a controller that controls operation of the opening/closing drive device 22. The door ECU 23 is connected to an in-vehicle power source (a battery) 24 and controls operation of the opening/closing drive device 22 using the drive power supplied based on the voltage of the in-vehicle power source 24. The door ECU 23 may be arranged in either the slide door 7 or the vehicle body 1.

Specifically, as illustrated in FIG. 2, the opening/closing drive device 22 has a slide actuator 25, a closer actuator 26, and a release actuator 27. The slide actuator 25 is connected to the slide door 7 through an appropriate transmission mechanism (not shown) and opens/closes the slide door 7 when the slide door 7 is in an openable and closable state. The closer actuator 26 is connected to the fully closing lock 11 through an appropriate transmission mechanism (not shown) to move the slide door 7 from an ajar state to the fully closed position Pc and then hold the slide door 7 using the fully closing lock 11. The release actuator 27 is connected to the fully closing lock 11 and the fully opening lock 12 each through an appropriate transmission mechanism (not shown). The release actuator 27 releases the slide door 7 from a held state at the fully closed position Pc by the fully closing lock 11 and from a held state at the fully open position Po by the fully opening lock 12.

More specifically, the slide actuator 25 includes a slide motor 31 serving as a drive source, an electromagnetic clutch 32, and a pulse sensor 33. The rotation direction and the rotating speed of the slide motor 31 are controlled by the drive power supplied from the door ECU 23. The electromagnetic clutch 32 is switched between an engaged state, in which rotation of the slide motor 31 is transmissible to the slide door 7, and a disengaged state, in which the rotation of the slide motor 31 is non-transmissible to the slide door 7, depending on whether the electromagnetic clutch 32 receives drive power from the door ECU 23. The slide motor 31 is connected to the slide door 7 (a transmission mechanism) through the electromagnetic clutch 32. By switching the electromagnetic clutch 32 to the disengaged state, the slide door 7 is allowed to move without rotation of the slide motor 31. This allows the user to manually open or close the slide door 7 without applying great force to the slide door 7.

The pulse sensor 33 outputs two pulse signals having different phases to the door ECU 23 in correspondence with rotation of the slide motor 31. The door ECU 23 counts the number of pulses in a pulse signal with reference to a predetermined position (for example, the fully closed position Pc), thus detecting the door position (the opening/closing position) of the slide door 7. The door ECU 23 also detects the rotation direction of the slide motor 31, which is the operating direction of the slide door 7, based on the order of input of the pulses of the two pulse signals input from the pulse sensor 33. Further, the door ECU 23 differentiates the detected door position to detect the operation velocity V of the slide door 7. That is, in the first embodiment, the pulse sensor 33 and the door ECU 23 both configure an opening/closing body position detector and a speed detector.

The closer actuator 26 includes a closer motor 34 serving as a drive source, a half-latch switch 35, and a full-latch switch 36. The rotation direction and the rotating speed of the closer motor 34 are controlled by the drive power supplied from the door ECU 23. The ON/OFF state of the half-latch switch 35 changes when the latch is switched to a stopping state to hold the slide door 7 in an ajar state. The ON/OFF state of the full-latch switch 36 changes when the latch is fully received by the striker to hold the slide door 7 at the fully closed position Pc.

If the slide door 7 is located at the fully open position Po when the door ECU 23 drives the opening/closing drive device 22 to move the slide door 7 in the closing direction (closing operation), the door ECU 23 drives the release actuator 27 to release the slide door 7 from the fully opening lock 12. Then, when the slide door 7 is in an openable and closable state, the door ECU 23 drives the slide actuator 25 to perform the closing operation of the slide door 7. When it is detected that the slide door 7 is in the ajar state based on the ON/OFF state of the half-latch switch 35, the door ECU 23 controls operation of the closer actuator 26 to retract the latch into the striker, thus holding the slide door 7 at the fully closed position Pc using the fully closing lock 11. When the slide door 7 is held at the fully closed position Pc, the door ECU 23 maintains the electromagnetic clutch 32 in the disengaged state.

In contrast, if the slide door 7 is located at the fully closed position Pc when the door ECU 23 drives the opening/closing drive device 22 to move the slide door 7 in the opening direction (opening operation), the door ECU 23 drives the release actuator 27 to release the slide door 7 from the fully closing lock 11. Then, when the slide door 7 is in the openable and closable state, the door ECU 23 drives the slide actuator 25 to perform the opening operation of the slide door 7. When it is determined that the slide door 7 is in a stopped state in a fully open range set in advance, the door ECU 23 determines that the slide door 7 is held at the fully open position Po by the fully opening lock 12. When the slide door 7 is held at the fully open position Po, the door ECU 23 maintains the electromagnetic clutch 32 in the disengaged state.

Figure 3:
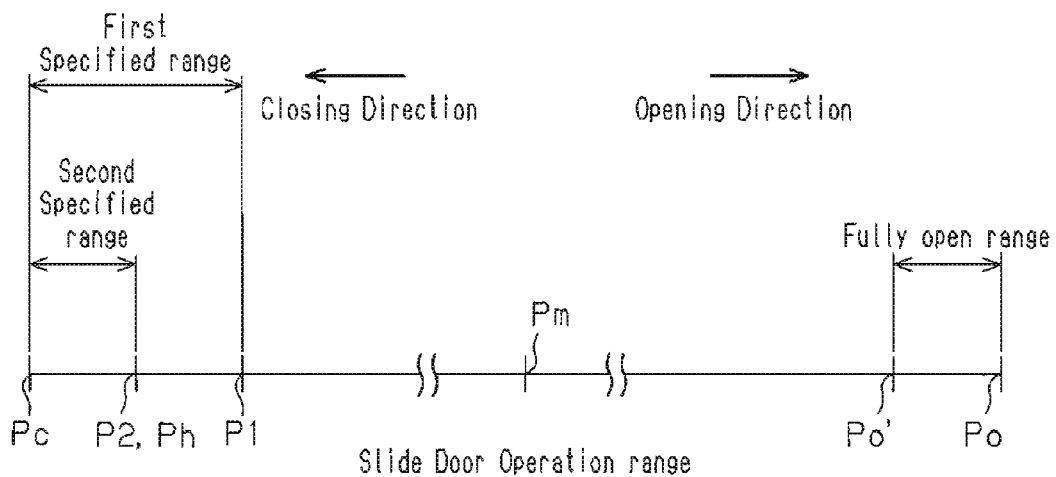
FIG. 3 is a diagram illustrating the operation range of a slide door.

With reference to FIG. 3, the fully open range is the range between the fully open position Po and an assumed fully open position Po', which is shifted in the closing direction from the fully open position Po. The fully open range is set considering variation from one vehicle to another in the position at which the fully opening lock 12 holds the slide door 7, which is caused by dimension tolerance of components including the slide door 7 and the rails 3 to 5. When the operation velocity V of the slide door 7, which is detected based on the pulse signals of the pulse sensor 33, continues to be less than a reference threshold speed Vth for a predetermined stop reference time or longer, the door ECU 23 determines that the slide door 7 is in a stopped state.

Also, referring to FIG. 2, the door ECU 23 is electrically connected to a driver's seat switch 41 arranged in an instrument panel, a handle switch 42 integrated with the door handle 14, and a pillar switch 43 arranged in a pillar 1a (a B-pillar) of the vehicle body 1 on the side facing the interior of the vehicle. The door ECU 23 is electrically connected also to a receiver ECU 45, which wirelessly communicates with a portable device (an electronic key) 44 carried by the user.

Specifically, the driver's seat switch 41 is configured by two switches, which are an open switch 41a and a close switch 41b. When pressed by the user, the open switch 41a outputs an opening manipulation signal to the door ECU 23 and the close switch 41b outputs a closing manipulation signal to the door ECU 23. The handle switch 42 outputs a trigger signal to the door ECU 23 in response to manipulation of the door handle 14 by the user. The trigger signal, which is input to the door ECU 23, is acknowledged as a manipulation signal in the direction opposite to the operating direction of the slide door 7 immediately before input of the trigger signal. For example, if the slide door 7 is being opened immediately before such input of the trigger signal, the trigger signal is acknowledged as the closing manipulation signal. The pillar switch 43, like the handle switch 42, outputs a trigger signal to the door ECU 23 when pressed by the user. A portable device switch 44a is arranged in the portable device 44. When receiving a transmission signal, which is produced by pressing the portable device switch 44a of the portable device 44, the receiver ECU 45 outputs a trigger signal to the door ECU 23, like the handle switch 42.

In response to the opening manipulation signal, the door ECU 23 executes opening operation control by which the opening/closing drive device 22 is driven to perform the opening operation of the slide door 7 toward the fully open position Po. In response to the closing manipulation signal, the door ECU 23 executes closing operation control by which the opening/closing drive device 22 is driven to perform the closing operation of the slide door 7 toward the fully closed position Pc. That is, in the first embodiment, the driver's seat switch 41, the handle switch 42, and the portable device switch 44*a* of the portable device 44 each correspond to an opening/closing manipulation detector that detects an opening/closing manipulation by which the opening/closing drive device 22 is driven to selectively open and close the slide door 7.

In the first embodiment, if the slide door 7 moves in the closing direction from a state within the fully open range and passes the assumed fully open position Po' due to a factor such as the weight of the slide door 7, the door ECU 23 drives the opening/closing drive device 22 to perform the closing operation of the slide door 7, or, in other words, executes closing operation control (assist closing operation control), even without detecting the opening/closing manipulation by the user.

A process of opening/closing control of the slide door by the door ECU will now be described. The door ECU 23 executes the procedure described in the steps below at predetermined cycles.

Figure 4:
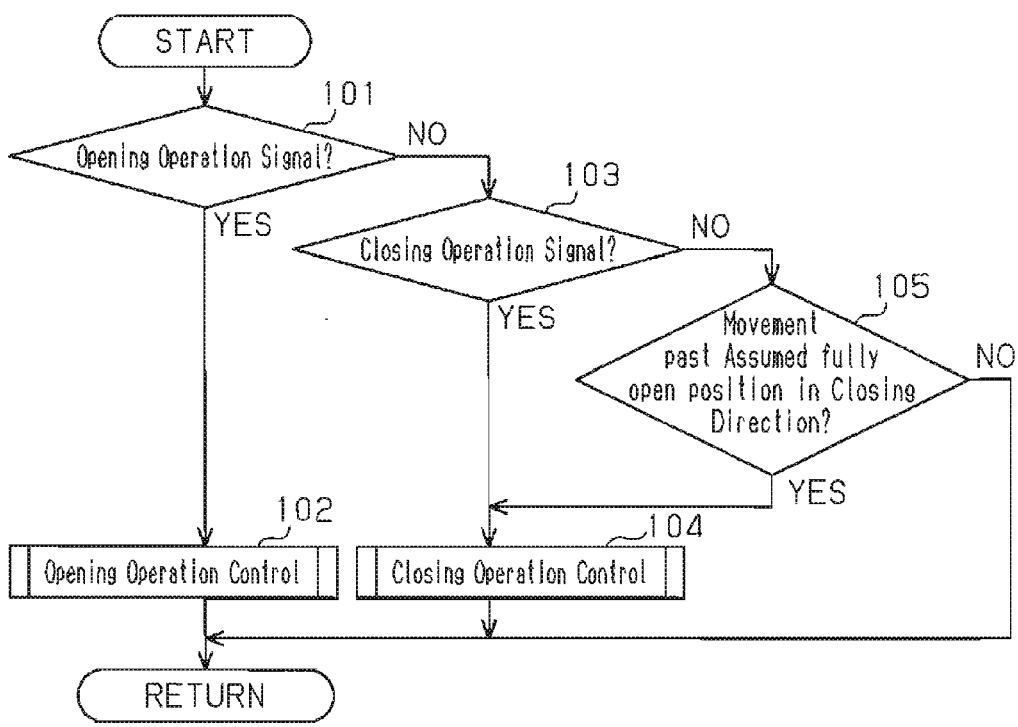
FIG. 4 is a flowchart illustrating a process of opening/closing operation control for the slide door.

With reference to the flowchart of FIG. 4, the door ECU 23 first determines whether the opening operation signal has been input (Step 101). If it is determined that the opening operation signal has been input (Step 101: YES), the door ECU 23 executes the opening operation control to control operation of the opening/closing drive device 22 to perform the opening operation of the slide door 7 (Step 102).

In contrast, if it is determined that the opening operation signal has not been input (Step 101: NO), the door ECU 23 determines whether the closing operation signal has been input (Step 103). When it is determined that the closing operation signal has been input (Step 103: YES), the door ECU 23 executes the closing operation control to control operation of the opening/closing drive device 22 to perform the closing operation of the slide door 7 (Step 104). If it is determined that the closing operation signal has not been input (Step 103: NO), the door ECU 23 determines whether the slide door 7 has been moved in the closing direction from the fully open range and has passed the assumed fully open position Po' (Step 105). If the slide door 7 has passed the assumed fully open position Po' (Step 105: YES), the door ECU 23 performs Step 104 and executes the closing operation control. If the slide door 7 has not passed the assumed fully open position Po' from the fully open range (Step S105: NO), the door ECU 23 executes neither the procedure of Step 102 nor the procedure of Step 104.

The power slide door device 21 of the first embodiment has a function of detecting a foreign object trapped between the slide door 7 and the vehicle body 1 at the time of the opening operation and the closing operation of the slide door 7. Such trapping of a foreign object may include trapping of an object such as an umbrella between the side of the slide door 7 corresponding to the inside panel and the vehicle body 1 and trapping of a part of the body of the user between the outer edge of the slide door 7 on the side corresponding to the vehicle front side and the door opening 2 when the user exits/enters the vehicle.

Specifically, as shown in FIG. 1, a touch sensor (a pressure sensor) 46 is arranged in an outer edge section of the slide door 7 on the side corresponding to the vehicle front side. The touch sensor 46 of the first embodiment has a plurality of electrode wires, which are arranged and spaced apart in a hollow tube constituted by an insulating body. The electrode wires contact or separate from one another in correspondence with contact pressure applied to the touch sensor 46 by a human body or the like. This changes a detection current I flowing in the electrode wires.

As illustrated in FIG. 2, the touch sensor 46 is connected to the door ECU 23. If the absolute value of the detection current I serving as a detection signal exceeds a trapping determination threshold value Ith0 for a predetermined trapping determination period or longer when the opening operation or the closing operation of the slide door 7 is performed, the door ECU 23 determines that trapping of a foreign object has occurred. Also, as in the above-described determination whether the slide door 7 has been held by the fully opening lock 12, the door ECU 23 determines whether the slide door 7 is in a stopped state based on the operation velocity V of the slide door 7. When the slide door 7 is in a stopped state, the door ECU 23 determines that trapping of a foreign object has occurred. That is, in the first embodiment, the combination of the pulse sensor 33 and the door ECU 23 and the combination of the touch sensor 46 and the door ECU 23 each configure a trapping detector.

If trapping of a foreign object by the slide door 7 is detected, the door ECU 23 reverses and moves the slide door 7 by a predetermined distance and then stops the slide door 7. Specifically, if the trapping of the foreign object is detected when the opening operation of the slide door 7 is performed, the door ECU 23 controls operation of the opening/closing drive device 22 to perform the closing operation of the slide door 7 by a predetermined closing-and-returning distance and then stop the slide door 7. If the trapping of the foreign object is detected when the closing operation of the slide door 7 is performed, the door ECU 23 controls operation of the opening/closing drive device 22 to perform the opening operation of the slide door 7 by a predetermined opening-and-returning distance and then stop the slide door 7. In the first embodiment, the closing-and-returning distance and the opening-and-returning distance are set as equal distances. After reversing and stopping the slide door 7 at an intermediate position (a position other than the fully open position Po and the fully closed position Pc) in the operation range in response to the detection of the trapping of the foreign object, the door ECU 23 maintains the electromagnetic clutch 32 in an engaged state. By maintaining the electromagnetic clutch 32 in the engaged state, the door position of the slide door 7 is held at the intermediate position using holding force, which is produced by holding torque (cogging torque) of the slide motor 31.

If the door ECU 23 detects an opening/closing manipulation by the user when the opening operation or the closing operation of the slide door 7 is performed, the door ECU 23 controls operation of the opening/closing drive device 22 such that the slide door 7 stops at the door position at which the opening/closing manipulation has been detected. After stopping the slide door 7 in response to the detection of the opening/closing manipulation by the user, the door ECU 23 maintains the electromagnetic clutch 32 in the engaged state to hold the door position of the slide door 7 at an intermediate position.

If the slide door 7 is stopped in the vicinity of the fully closed position Pc in response to the detection of trapping of a foreign object or an opening/closing manipulation by the user, the door opening 2 is almost closed by the slide door 7. This may cause false perceptions by the user that the slide door 7 is located at the fully closed position Pc. To avoid this, the door ECU 23 of the first embodiment changes the control manners of the opening/closing drive device 22 in correspondence with the door position of the slide door 7 at which the trapping of the foreign object is detected and the door position of the slide door 7 at which the opening/closing manipulation is detected, thus restraining stopping of the slide door 7 in the vicinity of the fully closed position Pc.

Specifically, with reference to FIG. 3, in the operation range of the slide door 7, the range between the fully closed position Pc and a first specified position (a specified position) P1, which is shifted in the opening direction from the fully closed position Pc, is set as a first specified range. The first specified position P1 is shifted in the closing direction from a middle position Pm in the operation range of the slide door 7 as a whole and shifted in the opening direction from a half-latch position Ph at which the slide door 7 is in an ajar state. The distance covered by the first specified range as a whole is set to be greater than both the closing-and-returning distance and the opening-and-returning distance. Also, in the operation range of the slide door 7, the range between the fully closed position Pc and a second specified position P2, which is shifted in the closing direction from the first specified position P1, is set as a second specified range. The second specified position P2 of the first embodiment is set as the position coinciding with the half-latch position Ph.

If the door position at which trapping of a foreign object is detected is in the first specified range when the opening operation is performed, the door ECU 23 controls operation of the opening/closing drive device 22 such that the slide door 7 moves to and then stops at the fully closed position Pc. If the door position at which the trapping of the foreign object is detected is outside the first specified range when the opening operation is performed, the door ECU 23 controls operation of the opening/closing drive device 22 to perform the closing operation of the slide door 7 by the predetermined closing-and-returning distance and then stop the slide door 7, as described above. The door position after the closing operation by the predetermined closing-and-returning distance may be either inside or outside the first specified range.

On the other hand, if the door position at which trapping of a foreign object is detected is in the first specified range when the closing operation is performed, the door ECU 23 controls operation of the opening/closing drive device 22 to perform the opening operation of the slide door 7 by at least the predetermined opening-and-returning distance or a greater distance and then stop the slide door 7 outside the first specified range. If the door position at which the trapping of the foreign object is detected is outside the first specified range, the door ECU 23 controls operation of the opening/closing drive device 22 to perform the opening operation of the slide door 7 by the predetermined opening-and-returning distance and then stop the slide door 7, as described above.

Further, if the door position at which an opening/closing manipulation by the user is detected, which is the door position at which the opening manipulation signal or the closing manipulation signal is input, is outside the second specified range when the opening operation or the closing operation is performed, the door ECU 23 controls operation of the opening/closing drive device 22 such that the slide door 7 does not stop at the door position.

More specifically, if the door position at which the opening manipulation signal or the closing manipulation signal is input is in the second specified range when the opening operation is performed, the door ECU 23 controls operation of the opening/closing drive device 22 to continue the opening operation of the slide door 7. If the door position at which the opening manipulation signal or the closing manipulation signal is input is outside the second specified range when the opening operation is performed, the door ECU 23 controls operation of the opening/closing drive device 22 such that the slide door 7 stops at the door position at which the aforementioned signal is input, as described above.

On the other hand, if the door position at which the opening manipulation signal is input is in the second specified range when the closing operation is performed, the door ECU 23 controls operation of the opening/closing drive device 22 such that the slide door 7 reverses to perform the opening operation and then moves to and stops at the fully open position Po. In contrast, if the door position at which the closing manipulation signal is input is in the second specified range when the closing operation is performed, the door ECU 23 controls operation of the opening/closing drive device 22 to continue the closing operation of the slide door 7. If the door position at which the opening manipulation signal or the closing manipulation signal is input is outside the second specified range when the closing operation is performed, the door ECU 23 controls operation of the opening/closing drive device 22 such that the slide door 7 stops at the door position at which the aforementioned signal is input, as described above.

When the opening operation is performed, the door ECU 23 of the first embodiment determines whether the door position of the slide door 7 is in the first specified range, in the second specified range, or outside the first specified range in correspondence with the pulse signal output by the pulse sensor 33. On the other hand, when the closing operation is performed, the door ECU 23 determines whether the door position of the slide door 7 is inside or outside the first specified range in correspondence with the pulse signal output by the pulse sensor 33 and determines whether the door position of the slide door 7 is in the second specified range in correspondence with the ON/OFF states of the half-latch switch 35 and the full-latch switch 36.

A process of opening operation control of the slide door by the door ECU will hereafter be described.

Figure 5:
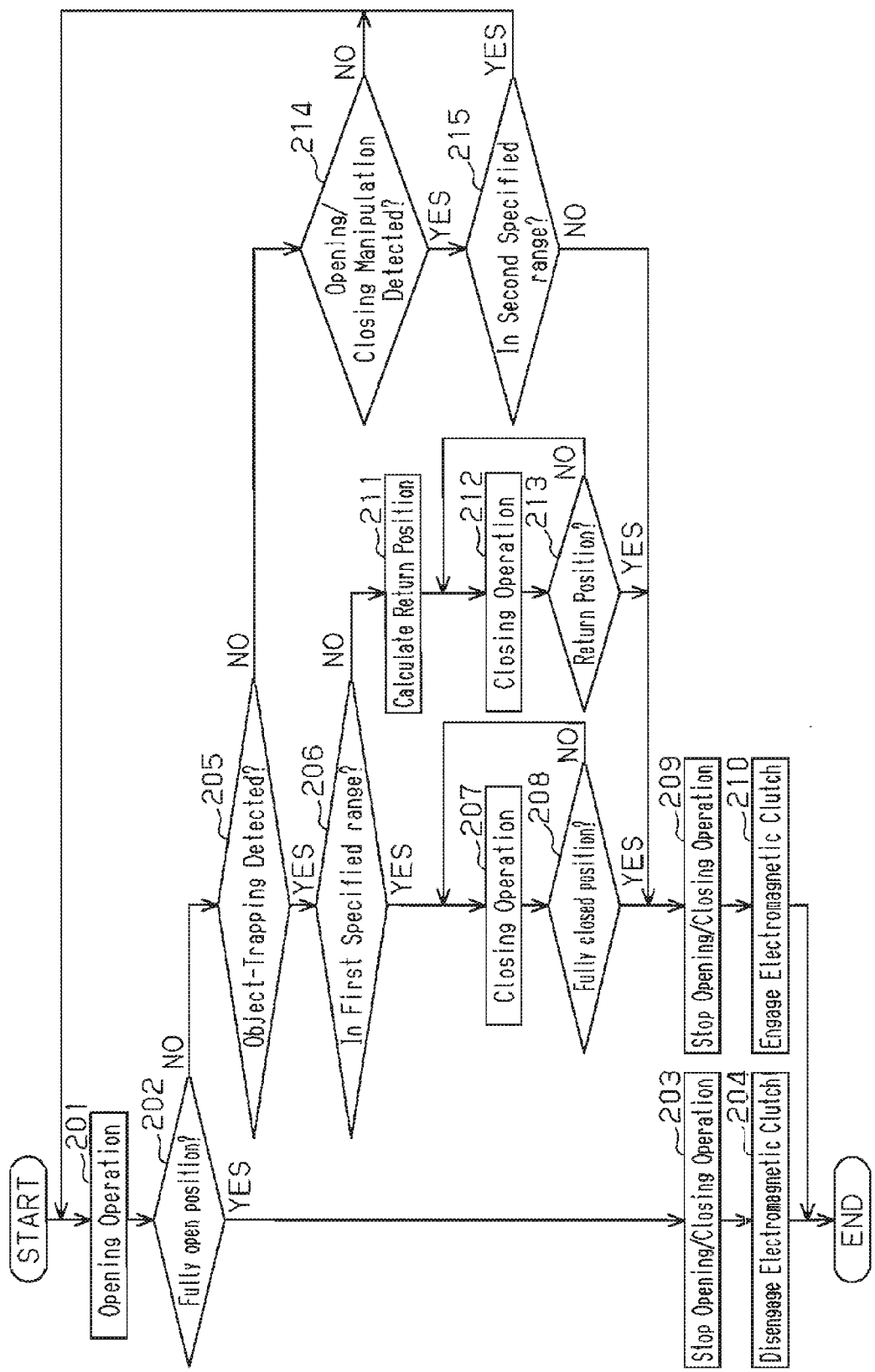
FIG. 5 is a flowchart illustrating a process of opening operation control of a first embodiment.

Referring to the flowchart of FIG. 5, the door ECU 23 drives the opening/closing drive device 22 to perform the opening operation of the slide door 7 (Step 201) and then determines whether the slide door 7 is located at the fully open position Po (Step 202). If it is determined that the slide door 7 is located at the fully open position Po (Step 202: YES), or, in other words, if the slide door 7 is moved to the fully open position Po without detecting trapping of a foreign object or an opening/closing manipulation by the user, the door ECU 23 stops the opening/closing operation of the slide door 7 by the opening/closing drive device 22 (Step 203) and switches the electromagnetic clutch 32 to the disengaged state (Step 204).

In contrast, if it is determined that the slide door 7 is not located at the fully open position Po (Step 202: NO), the door ECU 23 detects whether trapping of a foreign object by the slide door 7 has occurred (Step 205). If the trapping of the foreign object is detected (Step 205: YES), the door ECU 23 determines whether the door position at which the trapping of the foreign object is detected is in the first specified range (Step 206). If the door position at which the trapping of the foreign object is detected is in the first specified range (Step 206: YES), the door ECU 23 reverses the slide door 7 to perform the closing operation (Step 207)

and then determines whether the slide door 7 is located at the fully closed position Pc (Step 208). If the slide door 7 is located at the fully closed position Pc (Step 208: YES), the door ECU 23 stops the opening/closing operation of the slide door 7 by the opening/closing drive device 22 (Step 209) and switches the electromagnetic clutch 32 to the engaged state (Step 210). If the slide door 7 is not located at the fully closed position Pc (Step 208: NO), the door ECU 23 performs Step 207 to continue the closing operation and repeats the closing operation until the slide door 7 reaches the fully closed position Pc.

On the other hand, if the door position at which the trapping of the foreign object is detected is outside the first specified range (Step 206: YES), the door ECU 23 calculates a return position at which the slide door 7 will be stopped after being reversed. The return position is a position shifted in the closing direction by the predetermined closing-and-returning distance from the door position at which the trapping of a foreign object is detected (Step 211). The door ECU 23 then performs the closing operation of the slide door 7 (Step 212) and then determines whether the slide door 7 is located at the return position, which is calculated in Step 211 (Step 213). If the slide door 7 is located at the return position (Step 213: YES), the door ECU 23 performs Step 209 and stops the opening/closing operation of the slide door 7 by the opening/closing drive device 22 and switches the electromagnetic clutch 32 to the engaged state. When the slide door 7 is not located at the return position (Step 213: NO), the door ECU 23 performs Step 211 to continue the closing operation and repeats the closing operation until the slide door 7 reaches the return position.

If trapping of a foreign object by the slide door 7 is not detected (Step 205: NO), the door ECU 23 detects whether an opening/closing manipulation by the user has occurred (Step 214). Subsequently, when the opening/closing manipulation is detected (Step 214: YES), the door ECU 23 determines whether the door position at which the opening/closing manipulation is detected is in the second specified range (Step 215). If the door position at which the opening/closing manipulation is detected is in the second specified range (Step 215: YES), the door ECU 23 performs Step 201 to continue the opening operation. In contrast, if the door position at which the opening/closing manipulation is detected is not in the second specified range (Step 215: NO), the door ECU 23 performs Step 209 to stop the opening/closing operation of the slide door 7 by the opening/closing drive device 22 and then switch the electromagnetic clutch 32 to the engaged state. If an opening/closing manipulation is not detected (Step 214: NO), the door ECU 23 performs Step 201 to continue the closing operation.

A process of closing operation control of the slide door by the door ECU will hereafter be described.

Figure 6:
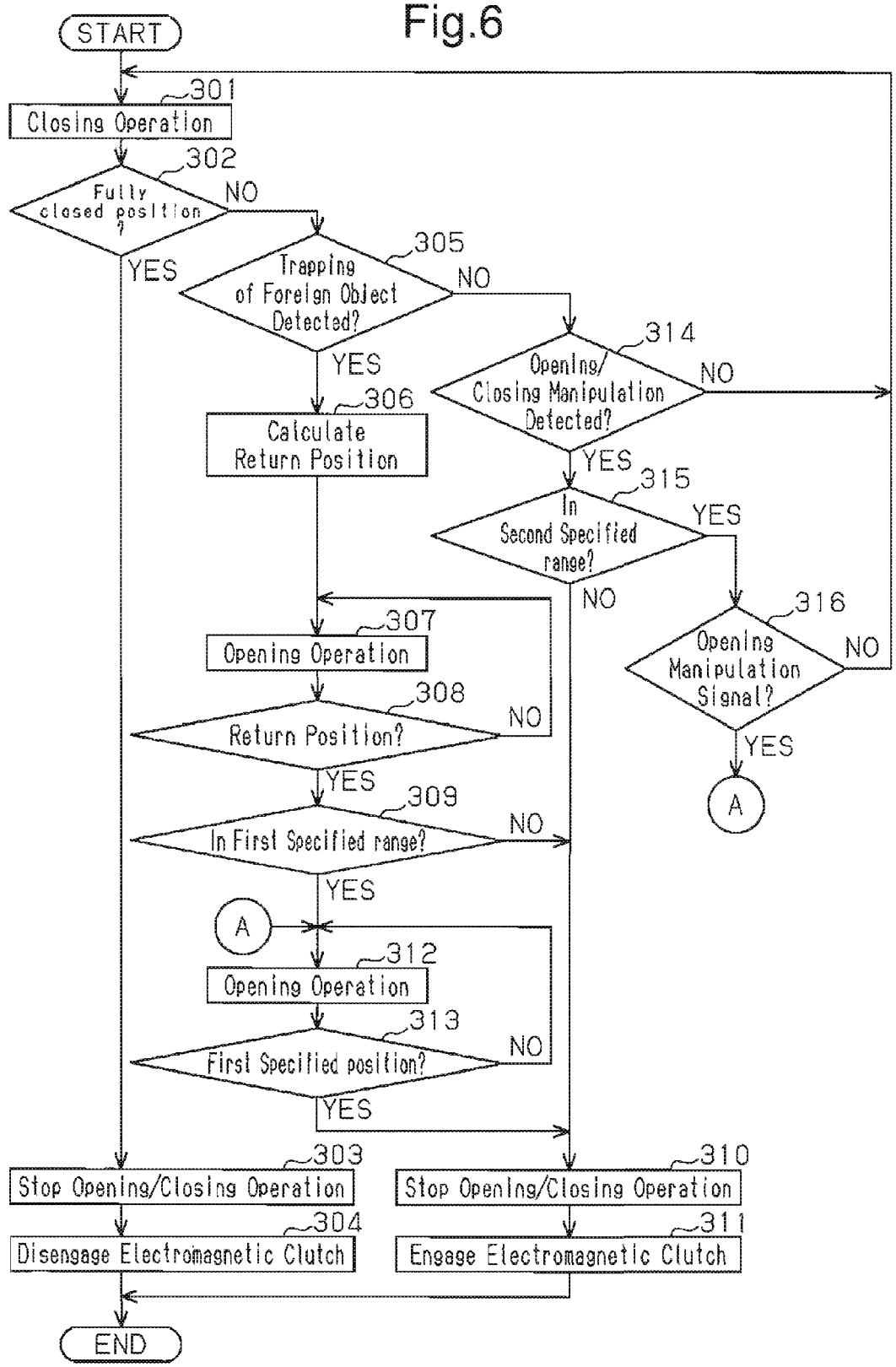
FIG. 6 is a flowchart illustrating a process of closing operation control of the first embodiment.

With reference to the flowchart of FIG. 6, the door ECU 23 drives the opening/closing drive device 22 to perform the closing operation of the slide door 7 (Step 301) and then determines whether the slide door 7 is located at the fully closed position Pc (Step 302). If it is determined that the slide door 7 is located at the fully closed position Pc (Step 302: YES), or, in other words, if the slide door 7 is moved to the fully open position Po without detecting trapping of a foreign object or an opening/closing manipulation by the user, the door ECU 23 stops the opening/closing operation of the slide door 7 by the opening/closing drive device 22 (Step 303) and then switches the electromagnetic clutch 32 to the disengaged state (Step 304).

In contrast, if it is determined that the slide door 7 is not located at the fully closed position Pc (Step 302: NO), the door ECU 23 detects whether trapping of a foreign object by the slide door 7 has occurred (Step 305). When the trapping of the foreign object is detected (Step 305: YES), the door ECU 23 calculates a return position at which the slide door 7 will be stopped after being reversed. The return position is a position shifted in the opening direction by the predetermined opening-and-returning distance from the door position at which the trapping of a foreign object is detected (Step 306). The door ECU 23 then reverses the slide door 7 to perform the opening operation (Step 307) and determines whether the slide door 7 is located at the return position, which is calculated in Step 306 (Step 308). If the slide door 7 is located at the return position (Step 308: YES), the door ECU 23 determines whether the slide door 7 at the return position is located in the first specified range (Step 309). If the slide door 7 is not located at the return position (Step 308: NO), the door ECU 23 performs Step 307 to continue the opening operation and repeats the opening operation until the slide door 7 reaches the return position.

If the slide door 7 at the return position is located outside the first specified range (Step 309: NO), the door ECU 23 stops the opening/closing operation of the slide door 7 by the opening/closing drive device 22 (Step 310) and switches the electromagnetic clutch 32 to the engaged state (Step 311). In contrast, if the slide door 7 is located in the first specified range (Step 309: YES), the door ECU 23 continues the opening operation of the slide door 7 (Step 312) and then determines whether the slide door 7 is located at the first specified position P1 (Step 313). When the slide door 7 is located at the first specified position P1 (Step 313: YES), the door ECU 23 performs Step 310 to stop the opening/closing operation of the slide door 7 by the opening/closing drive device 22 and then switches the electromagnetic clutch 32 to the engaged state. If the slide door 7 is not located at the first specified position P1 (Step 313: NO), the door ECU 23 performs Step 312 to continue the opening operation and repeats the opening operation until the slide door 7 reaches the first specified position P1.

If trapping of a foreign object by the slide door 7 is not detected (Step 305: NO), the door ECU 23 detects whether an opening/closing manipulation by the user has occurred (Step 314). If an opening/closing manipulation is detected (Step 314: YES), the door ECU 23 determines whether the door position at which the opening/closing manipulation is detected is in the second specified range (Step 315). When the door position is outside the second specified range (Step 315: NO), the door ECU 23 performs Step 310 to stop the opening/closing operation of the slide door 7 by the opening/closing drive device 22 and then switches the electromagnetic clutch 32 to the engaged state.

In contrast, if the door position at which the opening/closing manipulation is detected is in the second specified range (Step 315: YES), the door ECU 23 determines whether the opening manipulation signal has been input in Step 316 (Step 316). If the opening manipulation signal has been input (Step 316: YES), the door ECU 23 performs Step 312 to reverse the slide door 7 to perform the opening operation and then stops the slide door 7 at the first specified position P1. If the opening/closing manipulation is not detected (Step 314: NO) or if the closing manipulation signal has been input (Step 316: NO), the door ECU 23 performs Step 301 to continue the closing operation.

Operation of the present invention will now be described.

Figure 7A:
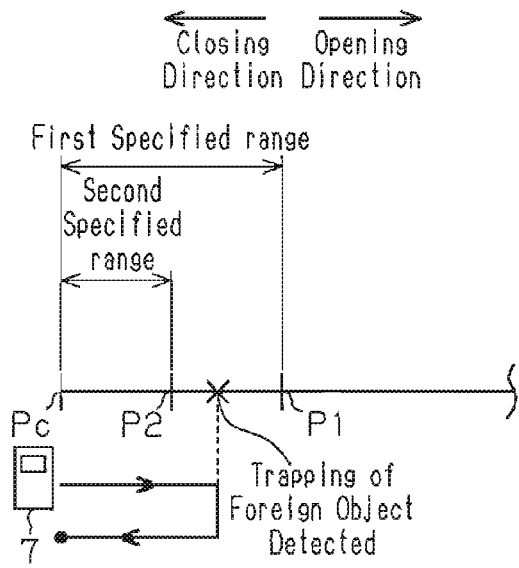
FIGS. 7A, 7B, 7C, and 7D are diagrams each illustrating behavior of the slide door at the time of the opening operation control of the first embodiment.
Figure 7B:
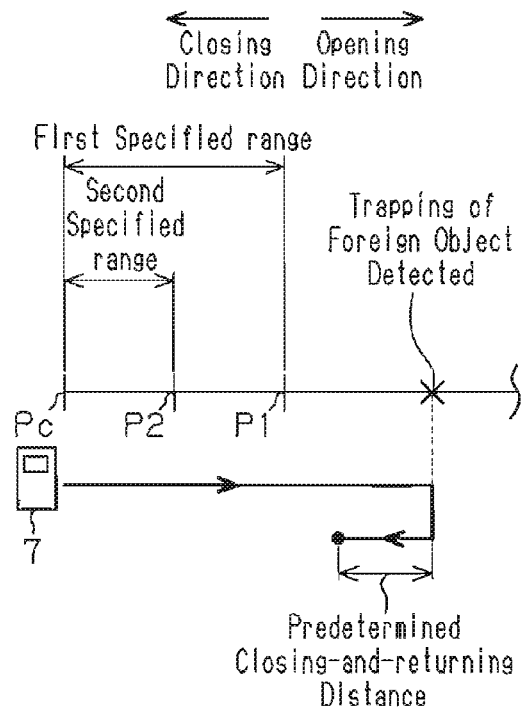
Figure 7C:
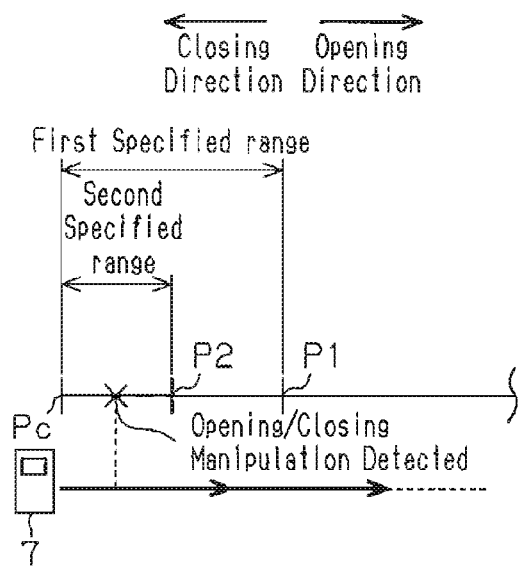
Figure 7D:
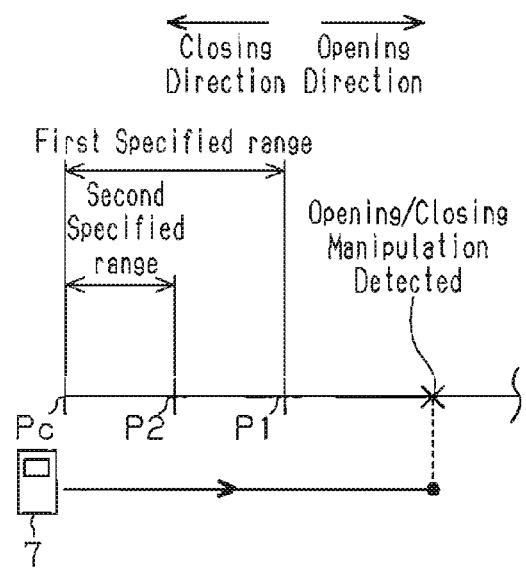

With reference to FIG. 7A, if trapping of a foreign object is detected when the slide door 7 is being opened and is located in the first specified range, such as immediately after the opening operation of the slide door 7 is performed from the fully closed position Pc, the door ECU 23 returns the slide door 7 to the fully closed position Pc and then stops the slide door 7. In contrast, referring to FIG. 7B, if trapping of a foreign object is detected when the slide door 7 is located outside the first specified range, the door ECU 23 performs the closing operation of the slide door 7 by the predetermined closing-and-returning distance and then stops the slide door 7. With reference to FIG. 7C, if an opening/closing manipulation is detected when the slide door 7 is located in the second specified range, the door ECU 23 continues the opening operation of the slide door 7. In contrast, referring to FIG. 7D, if an opening/closing manipulation is detected when the slide door 7 is located outside the second specified range, the door ECU 23 stops the slide door 7 at the door position at which the opening/closing manipulation is detected.

As illustrated in FIG. 8A, if trapping of a foreign object is detected when the slide door 7 is being closed and is located in the first specified range, such as when the slide door 7 is moved to a position in the vicinity of the fully closed position Pc through the closing operation, the door ECU 23 returns the slide door 7 by the predetermined opening-and-returning distance. Then, if the consequent position of the slide door 7 is located outside the first specified range, the door ECU 23 stops the slide door 7 at the position. In contrast, referring to FIG. 8B, if the door position after the slide door 7 is returned by the predetermined opening-and-returning distance is located in the first specified range, the door ECU 23 further returns the slide door 7 to the first specified position P1 and then stops the slide door 7. With reference to FIG. 8C, if trapping of a foreign object is detected when the slide door 7 is located outside the first specified range, the door ECU 23 performs the opening operation of the slide door 7 by the predetermined opening-and-returning distance and then stops the slide door 7. As illustrated in FIG. 8D, if, for example, the close switch 41b is pressed by the user and thus an opening/closing manipulation (a closing manipulation) for causing the closing operation of the slide door 7 is detected when the slide door 7 is located in the second specified range, the door ECU 23 continues the opening operation of the slide door 7 and then stops the slide door 7 at the fully closed position Pc.

In contrast, with reference to FIG. 8E, if, for example, the open switch 41a is pressed by the user and thus an opening/closing manipulation (an opening manipulation) for causing the opening operation of the slide door 7 is detected when the slide door 7 is located in the second specified range, the door ECU 23 returns the slide door 7 to the first specified position P1 and then stops the slide door 7. Referring to FIG. 8F, if an opening/closing manipulation is detected when the slide door 7 is located outside the second specified range, the door ECU 23 stops the slide door 7 at the door position at which the opening/closing manipulation is detected.

The first embodiment has the advantages described below.

(1) If trapping of a foreign object is detected when the slide door 7 is being opened and is located in the first specified range, the door ECU 23 returns the slide door 7 to the fully closed position Pc. The slide door 7 thus does not stop in the vicinity of the fully closed position Pc. This reduces false perceptions by the user that the slide door 7 is located at the fully closed position Pc, despite the fact that the slide door 7 is not actually located at the fully closed position Pc.

(2) If trapping of a foreign object is detected when the slide door 7 is being opened or being closed, the door ECU 23 reverses the slide door 7 by the predetermined distance and then stops the slide door 7. As a result, regardless of whether detection of trapping of a foreign object occurs when the slide door 7 is being opened or closed, the trapping of the foreign object is canceled and re-trapping of the same foreign object by the slide door 7 after the slide door 7 is reversed is restrained.

(3) If trapping of a foreign object is detected when the slide door 7 is being closed and is located in the first specified range, the door ECU 23 performs the opening operation of the slide door 7 by at least the predetermined opening-and-returning distance or a greater distance and then stops the slide door 7 outside the first specified range. This cancels the trapping of the foreign object and ensures a sufficient opening amount of the slide door 7, thus reducing the false perceptions by the user that the slide door 7 is located at the fully closed position Pc.

(4) If an opening/closing manipulation is detected when the slide door 7 is being opened or being closed, the door ECU 23 stops the slide door 7 at the door position at which the opening/closing manipulation is detected. The slide door 7 thus can be stopped at an intermediate position in the operation range. As a result, under a rainy weather, for example, the opening amount of the slide door 7 can be set to the minimum opening amount for allowing the user to exit/enter the vehicle. This improves usability.

(5) If an opening/closing manipulation is detected when the slide door 7 is located in the second specified range, the door ECU 23 does not stop the slide door 7 at the door position at which the manipulation is detected. This restrains the slide door 7 from being stopped in the vicinity of the fully closed position Pc, thus reducing the false perceptions by the user that the slide door 7 is located at the fully closed position Pc.

(6) If an opening/closing manipulation is detected when the slide door 7 is being opened and is located in the second specified range, the door ECU 23 continues the opening operation of the slide door 7. This sufficiently restrains the slide door 7 from being stopped in the vicinity of the fully closed position Pc.

(7) If a closing manipulation is detected when the slide door 7 is being closed and is located in the second specified range, the door ECU 23 continues the closing operation of the slide door 7. In contrast, if an opening manipulation is detected when the slide door 7 is being closed and is located in the second specified range, the door ECU 23 reverses the slide door 7 to perform the opening operation and then stops the slide door 7 at the first specified position P1. This sufficiently restrains the slide door 7 from being stopped in the vicinity of the fully closed position Pc.

Second Embodiment

A second embodiment will now be described with reference to the attached drawings. The second embodiment is configured identically to the first embodiment, as illustrated in FIGS. 1 and 2, and executes the same opening/closing control of the slide door as the first embodiment, referring to FIG. 4. The main difference between the second embodiment and the first embodiment is restricted to the manner in which the closing operation control is executed. Therefore, for illustrative purposes, identical reference numerals are given to components of the second embodiment that are identical to corresponding components of the first embodiment and description of the components is omitted herein.

The background art of the second embodiment will hereafter be described briefly.

Typically, a fully closing lock that holds the door position at the fully closed position and a fully opening lock that holds the door position at the fully open position are arranged in the slide door. This configuration stops the slide door from moving due to a factor such as the weight of the slide door when the vehicle is stopped on a slope and the slide door is located at either the fully closed position or the fully open position, for example. In many cases, a switch (a latch switch) indicating the operating state of the fully closing lock is arranged in the fully closing lock. This allows the door ECU, which controls operation of the opening/closing drive device, to determine whether the slide door is held at the fully closed position based on the ON/OFF state of the switch.

In contrast, in many cases, the fully opening lock does not have any switch indicating the operating state of the fully opening lock. Therefore, when the door ECU determines that the slide door is in a stopped state inside a fully open range, which is set in advance, the door ECU determines that the slide door is held at the fully open position by the fully opening lock. The fully open range is the range between the fully open position and an assumed fully open position, which is shifted in the closing direction from the fully open position. The fully open range is set considering variation from one vehicle to another in the position at which the slide door is held by the fully opening lock, which is caused by dimension tolerance of components of the slide door or the like.

Determination as to whether the slide door is in a stopped state is carried out based on change of an electric current supplied to the motor of the opening/closing drive device, as in the above-described method of detecting trapping of a foreign object.

In some cases, even when an opening/closing manipulation by the user (for example, manipulation of the door handle) is not detected, the door ECU may drive the opening/closing drive device to perform the closing operation of the slide door if the slide door moves in the closing direction from a position in the fully open range and passes the assumed fully open position. As a result, when the slide door is moved to the fully open position with the vehicle stopped on a slope and malfunctioning of the fully opening lock causes the slide door to move in the closing direction due to a factor such as the weight of the slide door, excessive increase of the operation velocity of the slide door is restrained and the impact applied to the vehicle body is reduced.

Figure 9:
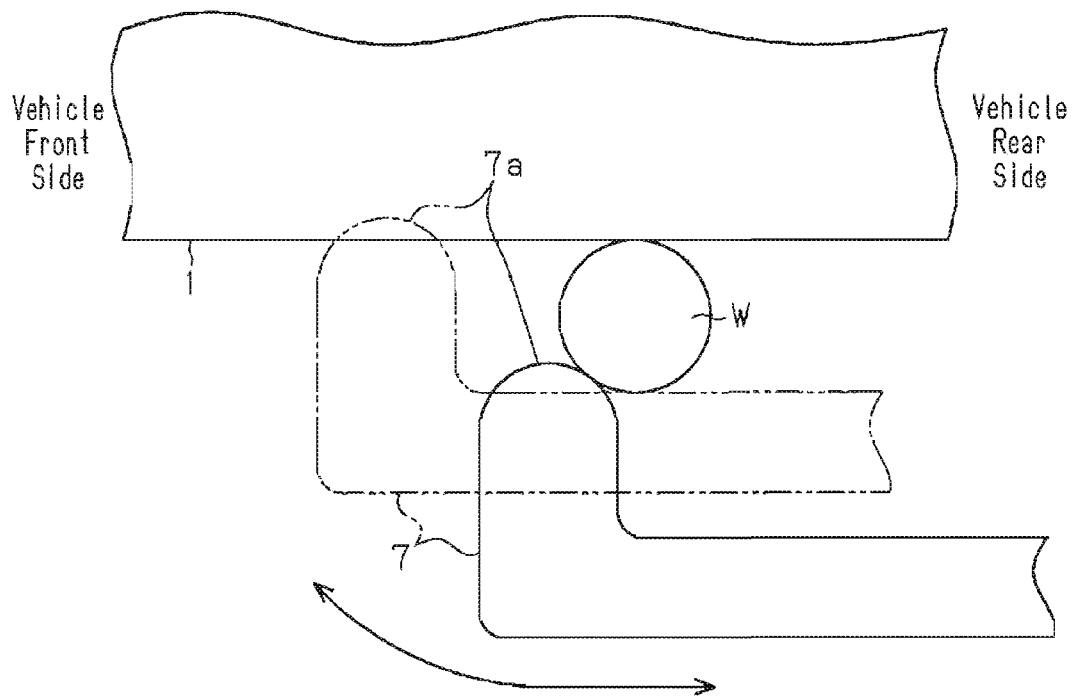
FIG. 9 is a diagram illustrating a manner in which a foreign object is trapped between the vehicle body and the slide door.

As illustrated in FIG. 9, when, for example, the vehicle is stopped on a slope and the slide door 7 is being opened, a foreign object W such as an umbrella may be trapped between a projecting portion 7a, such as a cup holder, which is arranged in the slide door 7, and the vehicle body 1. Such trapping of a foreign object may occur when the slide door 7 is located in the fully open range but held incompletely by the fully opening lock 12. In this case, as has been described, when the door ECU 23 determines that the slide door 7 is in a stopped state in the fully open range, the door ECU 23 determines that the slide door 7 is held at the fully open position Po by the fully opening lock 12. The door ECU 23 then stops the opening/closing operation of the slide door 7 by the opening/closing drive device 22 and switches the electromagnetic clutch 32 to the disengaged state. The slide door 7 thus moves in the closing direction due to the weight of the slide door 7 and passes the assumed fully open position Po'. This causes the door ECU 23 to drive the opening/closing drive device for the closing operation of the slide door 7, or, in other words, to execute the closing operation control.

Specifically, when the slide door 7 moves in the closing direction, the slide door 7 moves gradually toward the interior of the vehicle. This may re-trap the foreign object W between any portion of the slide door 7 other than the projecting portion 7a and the vehicle body 1, as represented by the long dashed double-short dashed lines in FIG. 9. When trapping of the foreign object W is detected, the door ECU 23 reverses the slide door 7 and performs the opening operation. The foreign object W is thus re-trapped at the position represented by the solid lines in the drawing. As a result, as has been described, with the slide door 7 held incompletely by the fully opening lock 12, the opening/closing operation of the slide door 7 by the opening/closing drive device 22 is stopped. The slide door 7 thus moves in the closing direction due to the weight of the slide door 7 and re-passes the assumed fully open position Po'. That is, if trapping of a foreign object occurs with the slide door 7 located in the fully open range but held incompletely by the fully opening lock 12, the closing operations and the opening operations of the slide door 7 may be repeated consecutively.

Such consecutive repetition of the opening/closing operation of the slide door 7 may happen not only in the case in which trapping of the foreign object W occurs when the slide door 7 is held incompletely by the fully opening lock after the slide door 7 is reversed to perform the opening operation in response to trapping of a foreign object. For example, the consecutive repetition of the opening/closing operation of the slide door 7 may happen also when the slide door 7 cannot be held at the fully open position due to malfunctioning of the fully opening lock.

To avoid this, when the slide door 7 is being closed and is located in a reverse prohibiting range at the time of detection of trapping of the foreign object W, the door ECU 23 of the second embodiment controls operation of the drive device 22 not to reverse the slide door 7 for the opening operation. That is, in the second embodiment, consecutive repetition of the closing operation and the opening operation of the slide door 7 is restrained.

Figure 10:
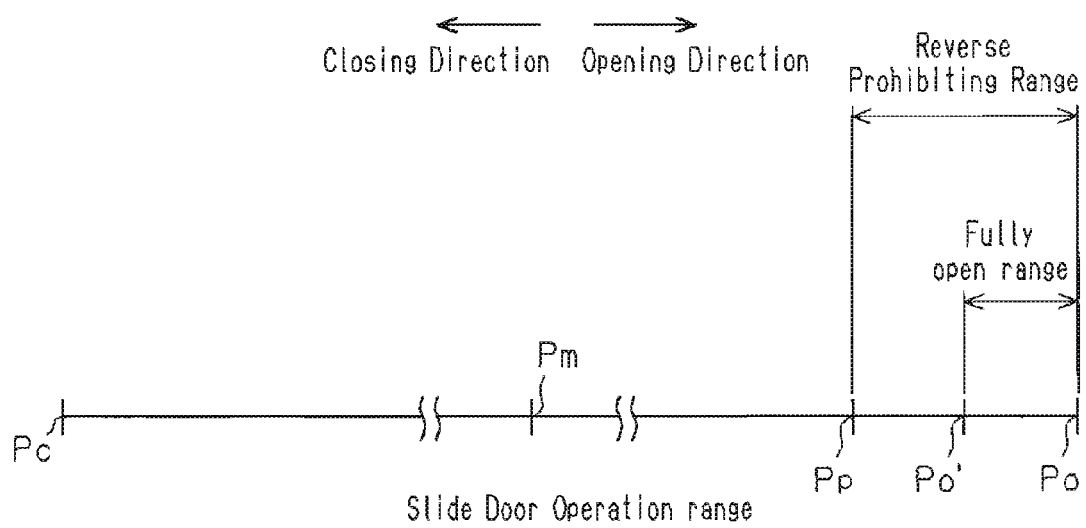
FIG. 10 is a diagram illustrating the operation range of the slide door.

Specifically, as illustrated in FIG. 10, the reverse prohibiting range is set as the range between the fully open range Po and a reverse prohibiting position Pp, which is shifted in the closing direction from the assumed fully open position Po', in the operation range of the slide door 7. The reverse prohibiting position Pp is set at a position that is shifted in the closing direction by a distance greater than the predetermined opening-and-returning distance from the assumed fully open position Po' and shifted in the opening direction from the middle position Pm. When the slide door 7 is being closed and the door position at which the trapping of the foreign object is detected is in the reverse prohibiting range, the door ECU 23 stops opening/closing operation of the slide door 7 by the opening/closing drive device 22 and intermittently switches the electromagnetic clutch 32 to the disengaged state. If the closing operation is performed and the door position at which the trapping of the foreign object is detected is outside the reverse prohibiting range, the door ECU 23 controls operation of the opening/closing drive device 22 to perform the opening operation of the slide door 7 by the predetermined opening-and-returning distance and then stop the slide door 7, as described above.

A process of closing operation control of the slide door by the door ECU will now be described.

Figure 11:
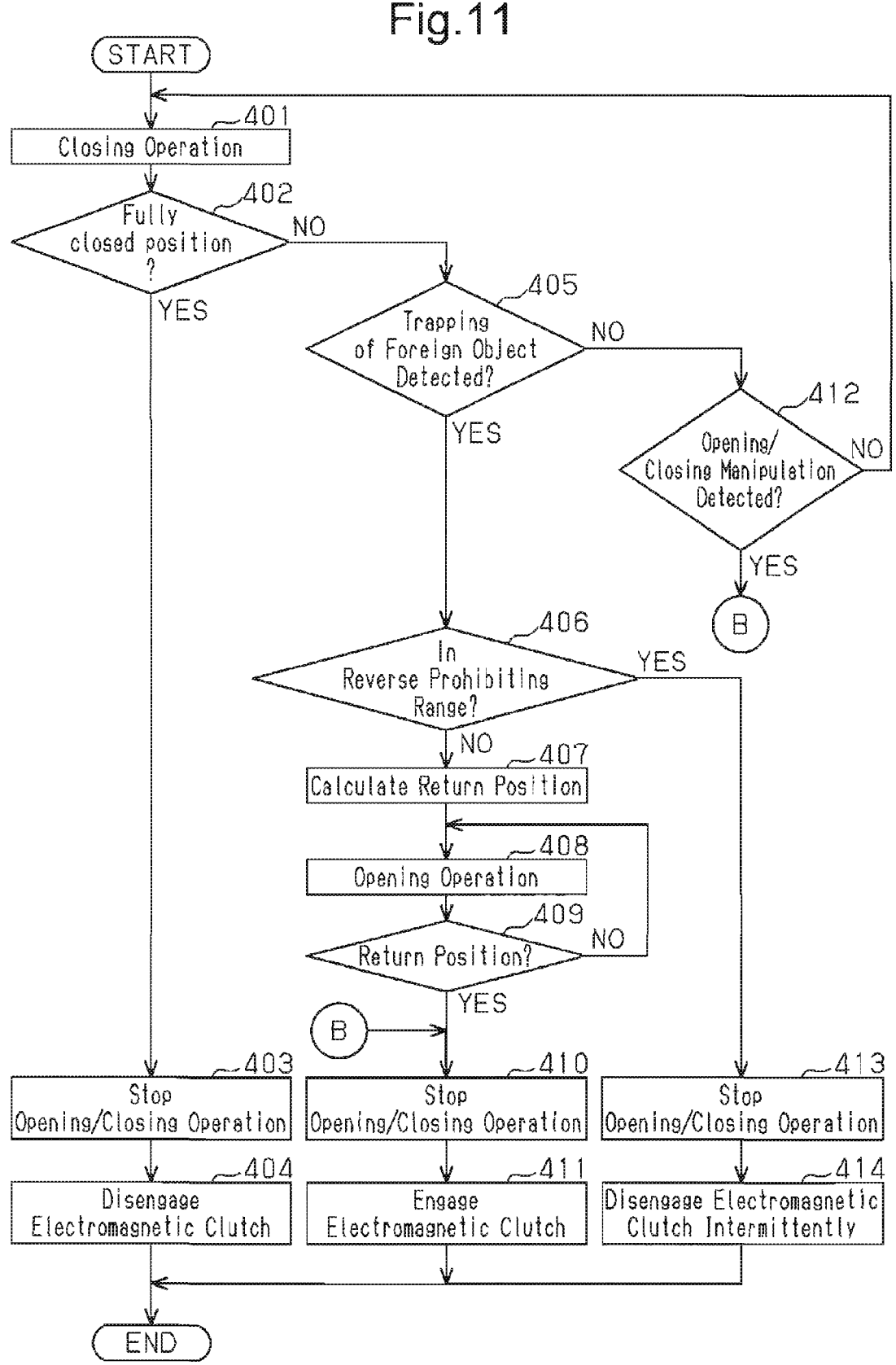
FIG. 11 is a flowchart illustrating a process of closing operation control of a second embodiment.

With reference to the flowchart of FIG. 11, the door ECU 23 drives the opening/closing drive device 22 to perform the closing operation of the slide door 7 (Step 401) and determines whether the slide door 7 is located at the fully closed position Pc (Step 402). When it is determined that the slide door 7 is located at the fully closed position Pc (Step 402: YES), the door ECU 23 stops the opening/closing operation of the slide door 7 by the opening/closing drive device 22 (Step 403) and switches the electromagnetic clutch 32 to the disengaged state (Step 404).

In contrast, when it is determined that the slide door 7 is not located at the fully closed position Pc (Step 402: NO), the door ECU 23 detects whether trapping of a foreign object by the slide door 7 has occurred (Step 405). Then, if trapping of a foreign object is detected (Step 405: YES), the door ECU 23 determines whether the door position at which the trapping of the foreign object is detected is in the reverse prohibiting range (Step 406). If the door position is outside the reverse prohibiting range (Step 406: NO), the door ECU 23 calculates a return position at which the slide door 7 will be stopped after being reversed (Step 407) and reverses the slide door 7 and performs the opening operation (Step 408). Then, the door ECU 23 determines whether the slide door 7 is located at the return position, which is calculated in Step 407 (Step 409). If the slide door 7 is located at the return position (Step 409: YES), the door ECU 23 stops the opening/closing operation of the slide door 7 by the opening/closing drive device 22 (Step 410) and switches the electromagnetic clutch 32 to the engaged state (Step 411). If the slide door 7 is not located at the return position (Step 409: NO), the door ECU 23 performs Step 408 to continue the opening operation and repeats the opening operation until the slide door 7 reaches the return position.

If trapping of a foreign object by the slide door 7 is not detected (Step 405: NO), the door ECU 23 detects whether an opening/closing manipulation by the user has occurred (Step 412). If an opening/closing manipulation is detected (Step 412: YES), the door ECU 23 performs Step 410 to stop the opening/closing operation of the slide door 7 by the opening/closing drive device 22 and switches the electromagnetic clutch 32 to the engaged state. If an opening/closing operation is not detected (Step 412: NO), the door ECU 23 performs Step 401 to continue the closing operation.

In contrast, if the door position at which the trapping of the foreign object is detected is in the reverse prohibiting range (Step 406: YES), the door ECU 23 stops the opening/closing operation of the slide door 7 by the opening/closing drive device 22 (Step 413) and intermittently switches the electromagnetic clutch 32 to the disengaged state (Step 414).

Operation of the second embodiment will hereafter be described.

If trapping of a foreign object occurs when, for example, the vehicle is stopped on a slope and the slide door 7 is in the fully open range but held incompletely by the fully opening lock 12, the opening/closing operation of the slide door 7 by the opening/closing drive device 22 is stopped and the electromagnetic clutch 32 is switched to the disengaged state. This moves the slide door 7 in the closing direction due to the weight of the slide door 7. If the slide door 7 passes the assumed fully open position Po', the closing operation control is executed.

Figure 12A:
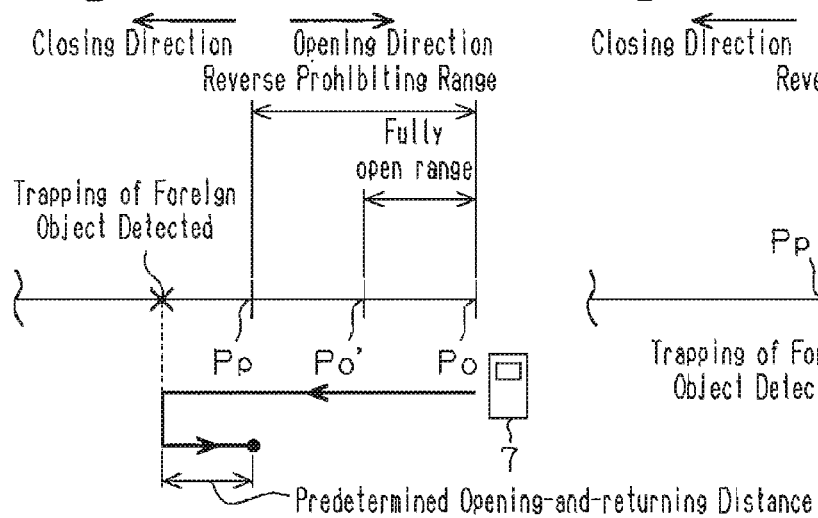
FIGS. 12A and 12B are diagrams each illustrating behavior of the slide door at the time of the closing operation control of the second embodiment.

At this stage, as illustrated in FIG. 12A, if trapping of a foreign object is detected after the slide door 7 passes the reverse prohibiting position Pp, the door ECU 23 performs the opening operation of the slide door 7 by the predetermined opening-and-returning distance and then stops the slide door 7. As has been described, the reverse prohibiting position Pp is set as the position greatly spaced from the assumed fully open position Po' by a distance greater than the predetermined opening-and-returning distance in the closing direction. The slide door 7 thus does not return to the fully open range. As a result, the door ECU 23 does not determine that the slide door 7 is held at the fully open position Po by the fully opening lock 12 and maintains the electromagnetic clutch 32 in the engaged state. This restrains the closing operation of the slide door 7 caused by the weight of the slide door 7.

Figure 12B:
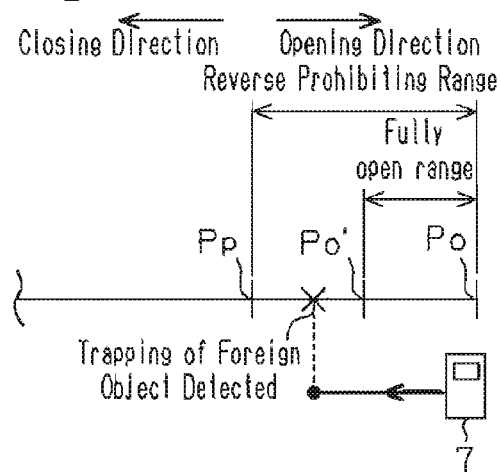

In contrast, referring to FIG. 12B, if trapping of a foreign object is detected before the slide door 7 passes the reverse prohibiting position Pp, the door ECU 23 stops the slide door 7 at the door position at which the trapping of the foreign object is detected. Then, the door ECU 23 intermittently switches the electromagnetic clutch 32 to the disengaged state. This allows the user to manually move the slide door 7 in the closing direction in a stepped manner and then remove the foreign object.

Next, advantages of the second embodiment will be described. The second embodiment has the following advantages in addition to the advantages (1) to (7) of the first embodiment.

(8) If the slide door 7 is being closed and is located in the reverse prohibiting range at the time of detecting trapping of a foreign object, the door ECU 23 does not reverse the slide door 7 for the opening operation. This restrains return of the slide door 7 into the fully open range in response to the trapping of the foreign object. In this manner, the occurrences of trapping of a foreign object with the slide door 7 held incompletely by the fully opening lock 12 are reduced. Consecutive occurrences of the closing operation and the opening operation of the slide door 7 are thus restrained.

(9) If the door position at which trapping of a foreign object is detected is outside the reverse prohibiting range, the door ECU 23 reverses the slide door 7 to perform the opening operation of the slide door 7 by the predetermined opening-and-returning distance and then stop the slide door 7. This cancels the trapping of the foreign object and restrains re-trapping of the same foreign object by the slide door 7 after the slide door 7 is reversed. Further, the reverse prohibiting position Pp is set as the position greatly spaced from the assumed fully open position Po' by a distance greater than the predetermined opening-and-returning distance in the closing direction. Therefore, if the door position at which the trapping of the foreign object is detected is such a position that the opening operation by the predetermined opening-and-returning distance returns the door position into the fully open range, the slide door 7 is not reversed for the opening operation. This sufficiently restrains return of the slide door 7 into the fully open range caused by reverse of the slide door 7 for the opening operation in response to trapping of a foreign object. As a result, repetitive trapping of a foreign object with the slide door 7 held incompletely by the fully opening lock 12 is effectively reduced. Also, consecutive repetition of the closing operation and the opening operation of the slide door 7 is effectively restrained.

(10) If the door position at which trapping of a foreign object is detected is in the reverse prohibiting range when the slide door 7 is being closed, the door ECU 23 stops opening/closing operation of the slide door 7 by the opening/closing drive device 22 and intermittently switches the electromagnetic clutch 32 to the disengaged state. This allows the user to manually move the slide door 7 in the closing direction in a stepped manner, thus facilitating release of the foreign object.

Third Embodiment

A third embodiment will now be described with reference to the attached drawings. The main difference between the third embodiment and the first embodiment is restricted to the manner in which control is executed after the slide door is stopped at an intermediate position. Therefore, for illustrative purposes, identical reference numerals are given to components of the third embodiment that are identical to corresponding components of the first embodiment and description of the components is omitted herein.

If, for example, the vehicle is stopped on a steep slope and the component force applied to the slide door 7 in the closing direction in correspondence with the weight of the slide door 7 exceeds the holding force produced by the holding torque of the slide motor 31, the slide door 7, which is stopped at an intermediate position, moves in the closing direction, thus causing trapping of a foreign object.

Therefore, if the slide door 7 moves in the closing direction from a stopped state at an intermediate position in a state in which no drive power is supplied to the slide motor 31 and trapping of a foreign object is detected based on the detection current I, which is output by the touch sensor 46, the door ECU 23 controls operation of the opening/closing drive device 22 to move the slide door 7 to the fully open position Po. Also, for detection of trapping of a foreign object in a state in which no drive power is supplied to the slide motor 31, the door ECU 23 determines that trapping of a foreign object has occurred if the absolute value of the detection current I is maintained greater than a high-sensitivity trapping determination threshold value Ith1 continuously for a predetermined trapping determination period. The high-sensitivity trapping determination threshold value Ith1 is set as a value smaller than the aforementioned trapping determination threshold value Ith0. That is, for the case in which the slide door 7 moves in the closing direction in a state in which no drive power is supplied to the slide motor 31, the door ECU 23 changes a detection condition for detecting trapping of a foreign object based on the detection current I such that a detection result that a foreign object is trapped is obtained easily compared to a case in which the opening/closing drive device 22 is driven to perform the closing operation of the slide door 7.

On the other hand, if trapping of a foreign object is detected based on the operation velocity V of the slide door 7 when the closing operation of the slide door 7 is performed from a state in which the slide door 7 is stopped at an intermediate position in a state in which no drive power is supplied to the slide motor 31, the door ECU 23 maintains the slide motor 31 continuously in the state in which no drive power is supplied.

A process after stopping the slide door 7 at an intermediate position in the operation range of the slide door 7 in response to trapping of a foreign object or opening/closing manipulation by the user will hereafter be described.

Figure 13:
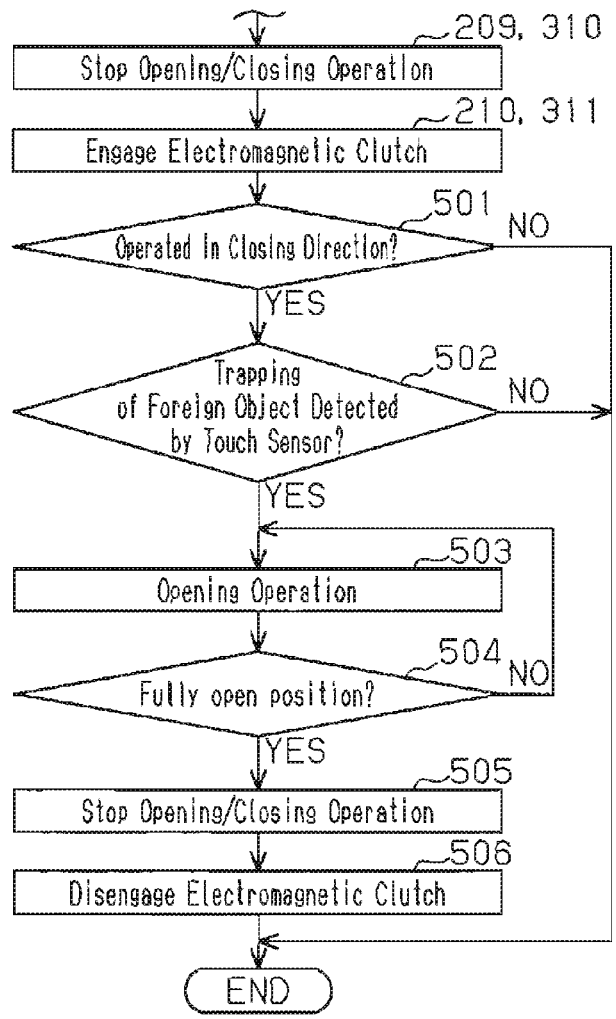
FIG. 13 is a flowchart illustrating a process after the slide door is stopped at an intermediate position under opening operation control or closing operation control of a third embodiment.

With reference to FIG. 13, the door ECU 23 stops the opening/closing operation of the slide door 7 by the opening/closing drive device 22 (Step 209 or Step 310) and switches the electromagnetic clutch 32 to the engaged state (Step 210 or Step 311). The door ECU 23 then determines whether the slide door 7 has moved in the closing direction in a state in which no drive power is supplied to the slide motor 31 (Step 501). If the slide door 7 has moved in the closing direction in a state in which no drive power is supplied to the slide motor 31 (Step 501: YES), the door ECU 23 detects whether trapping of a foreign object by the slide door 7 has occurred based on the detection current I, which is output by the touch sensor 46 (Step 502).

Such detection of trapping of a foreign object is carried out based on comparison between the levels of the detection current I and the high-sensitivity trapping determination reference threshold value Ith1. The detection of trapping of a foreign object based on the detection current in Steps 205 and 305 (see FIGS. 5 and 6) is carried out based on comparison between the levels of the detection current I and the trapping determination threshold value Ith0.

Then, if trapping of a foreign object is detected based on the detection current I (Step 502: YES), the door ECU 23 drives the opening/closing drive device 22 to perform the opening operation of the slide door 7 (Step 503) and determines whether the slide door 7 is located at the fully open position Po (Step 504).

If the slide door 7 is located at the fully open position Po (Step 504: YES), the door ECU 23 stops the opening/closing operation of the slide door 7 by the opening/closing drive device 22 (Step 505) and switches the electromagnetic clutch 32 to the disengaged state (Step 506).

If the slide door 7 is not located at the fully open position Po (Step 504: NO), the door ECU 23 performs Step 503 to continue the opening operation and repeats the opening operation until the slide door 7 reaches the fully open position Po.

In contrast, if movement of the slide door 7 in the closing direction in a state in which no drive power is supplied to the slide motor 31 does not happen after the electromagnetic clutch 32 is switched to the engaged state (Step 501: NO), the door ECU 23 maintains the electromagnetic clutch 32 in the engaged state. Also, not only when detection of trapping of a foreign object based on the detection current I does not happen (Step 502: NO), which is when such trapping of a foreign object does not occur, but also when trapping of a foreign object is detected based on the operation velocity V of the slide door 7, the door ECU 23 maintains the electromagnetic clutch 32 in the engaged state.

Operation of the third embodiment will now be described.

Figure 14A:
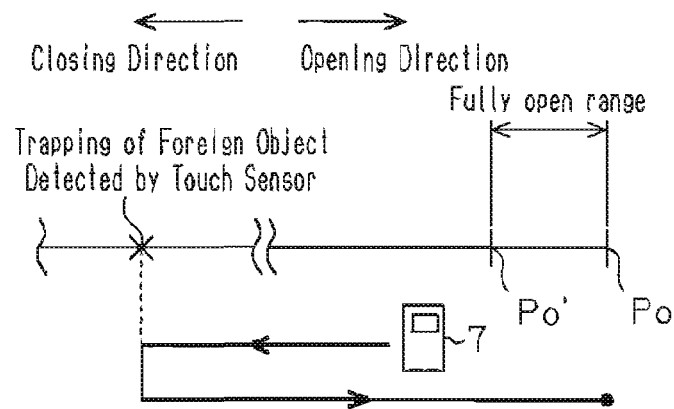
FIGS. 14A and 14B are diagrams each illustrating behavior of the slide door after the slide door is stopped at the intermediate position in the third embodiment.
Figure 14B:
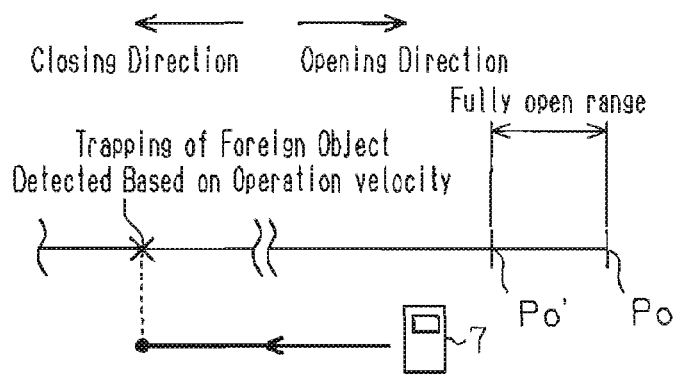

As illustrated in FIGS. 14A and 14B, when, for example, the vehicle is stopped on a steep slope to allow the user to exit/enter the vehicle with the slide door 7 stopped at an intermediate position, the slide door 7 may move in the closing direction due to a factor such as the weight of the slide door 7. With reference to FIG. 14A, if, for example, the user is trapped and the trapping is detected based on the detection current I of the touch sensor 46, the door ECU 23 drives the opening/closing drive device 22 to move the slide door 7 to the fully open position Po. The slide door 7 is thus held at the fully open position Po by the fully opening lock 12. This allows the user to easily exit/enter the vehicle.

As illustrated in FIG. 14B, when, for example, the user notices that the slide door 7 is moving in the closing direction due to a factor such as the weight of the slide door 7 and manually stops the slide door 7, the door ECU 23 maintains the slide motor 31 continuously in the state in which no drive power is supplied even if trapping of a foreign object is detected based on the operation velocity V of the slide door 7. This maintains the slide door 7 in a stopped state at the current door position, thus reducing discomfort for the user.

Figure 14C:
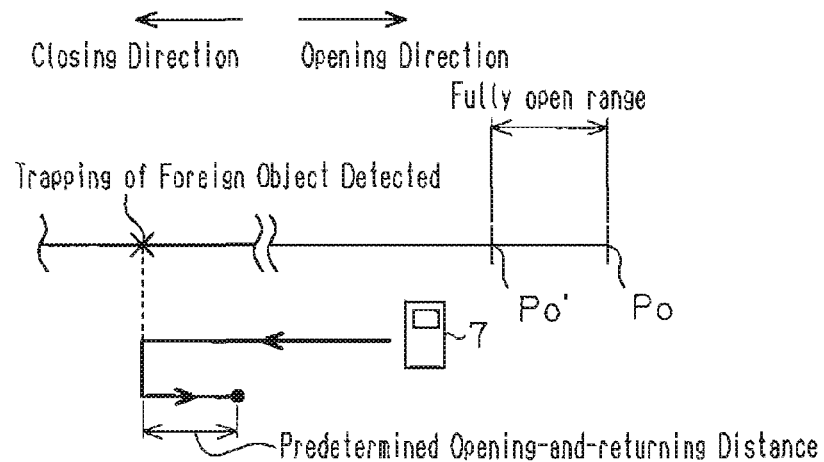
FIG. 14C is a diagram illustrating behavior of the slide door under the closing operation control.
Figure 15:
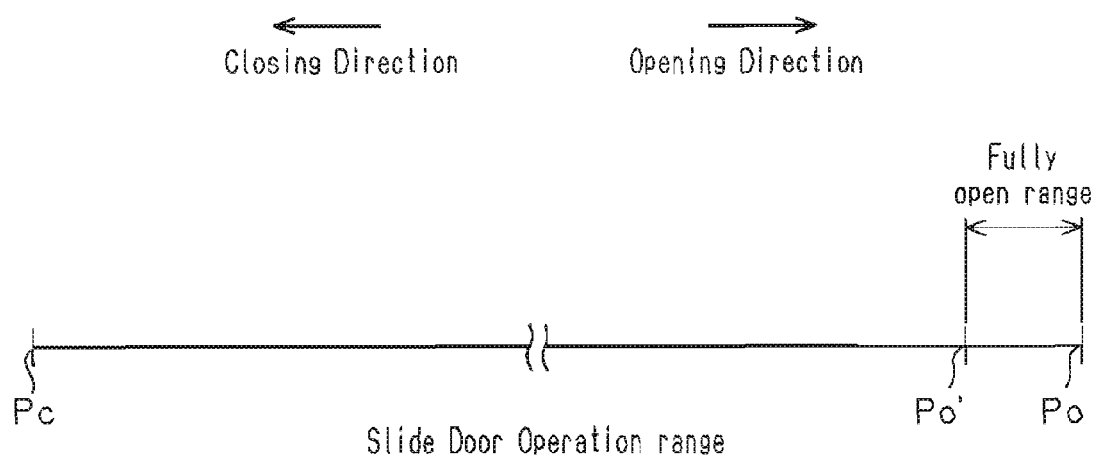
FIG. 15 is a diagram illustrating an operation range of the slide door.

Referring to FIG. 14C, if trapping of a foreign object is detected based on either the detection current I of the touch sensor 46 or the operation velocity V of the slide door 7 when the opening/closing drive device 22 is driven to perform the closing operation of the slide door 7, the door ECU 23 performs the opening operation of the slide door 7 by the predetermined opening-and-returning distance and then stops the slide door 7. This cancels the trapping of the foreign object and restrains re-trapping of the same foreign object by the slide door 7 after the slide door 7 is reversed.

Next, advantages of the third embodiment will be described. The third embodiment has the following advantages in addition to the advantages (1) to (7) of the first embodiment.

(11) If trapping of a foreign object is detected based on the detection current I, which is output by the touch sensor 46, when the slide door 7 moves in the closing direction in a state in which no drive power is supplied to the slide motor 31 due to a factor such as the weight of the slide door 7, the door ECU 23 drives the opening/closing drive device 22 to perform the opening operation of the slide door 7 to the fully open position Po. The trapping of the foreign object is thus canceled and, by holding the slide door 7 at the fully open position Po using the fully opening lock 12, re-movement of the slide door 7 in the closing direction caused by a factor such as the weight of the slide door 7 and consequent trapping of a foreign object are restrained.

(12) If trapping of a foreign object is detected based on the operation velocity V of the slide door 7 when the slide door 7 moves in the closing direction from a stopped state at an intermediate position in a state in which no drive power is supplied to the slide motor 7, the door ECU 23 maintains the slide motor 31 continuously in the state in which no drive power is supplied.

Specifically, in many cases in which trapping of a foreign object is detected based on the detection current I of the touch sensor 46, the user may physically contact the slide door 7 (the touch sensor 46) inadvertently without noticing that the slide door 7 is moving. Therefore, for cases in which trapping of a foreign object is detected based on the detection current I, it is preferable to restrain repeated closing operation of the slide door 7 by moving the slide door 7 to the fully open position Po and holding the slide door 7 using the fully opening lock 12. In contrast, in cases in which trapping of a foreign object is detected based on the operation velocity V, the user may notice that the slide door 7 is moving in the closing direction due to a factor such as the weight of the slide door 7 and manually stop the slide door 7, as has been described. Therefore, for cases in which trapping of a foreign object is detected based on the operation velocity V, discomfort for the user is reduced by maintaining the slide motor 31 continuously in the state in which no drive power is supplied and prohibiting the slide door 7 from moving. In the third embodiment, as a result, the slide door 7 is moved to the fully open position Po appropriately when such movement is highly needed and usability is improved effectively.

(13) If trapping of a foreign object is detected when the opening/closing drive device 22 is driven to perform the closing operation of the slide door 7, the door ECU 23 performs the opening operation of the slide door 7 by the predetermined opening-and-returning distance and then stops the slide door 7. Therefore, when the slide door 7 is being closed and trapping of a foreign object is detected, the trapping of the foreign object is canceled and re-trapping of the same foreign object by the slide door 7 after the slide door 7 is reversed is restrained.

(14) For a case in which the slide door 7 moves in the closing direction from a stopped state at an intermediate position in a state in which no drive power is supplied to the slide motor 31, the door ECU 23 changes the detection condition for detecting trapping of a foreign object based on the detection current I such that a detection result that a foreign object is trapped is obtained easily compared to a case in which the opening/closing drive device 22 is driven to perform the closing operation of the slide door 7.

Specifically, when the slide door 7 moves in the closing direction in a state in which no drive power is supplied to the slide motor 31 due to a factor such as the weight of the slide door 7, the holding force produced by the holding torque of the slide motor 31 acts as brake and the operation velocity V of the slide door 7 is comparatively small. The contact pressure applied to the touch sensor 46 by a foreign object thus tends to be small. Therefore, by relaxing the detection condition for detecting trapping of a foreign object based on the detection current I of the touch sensor 46 in a case in which the closing operation of the slide door 7 is performed from a state in which the slide door 7 is stopped at an intermediate position in a state in which no drive power is supplied to the slide motor 31, as has been described, trapping of a foreign object is detected with improved accuracy.

Fourth Embodiment

Figure 16:
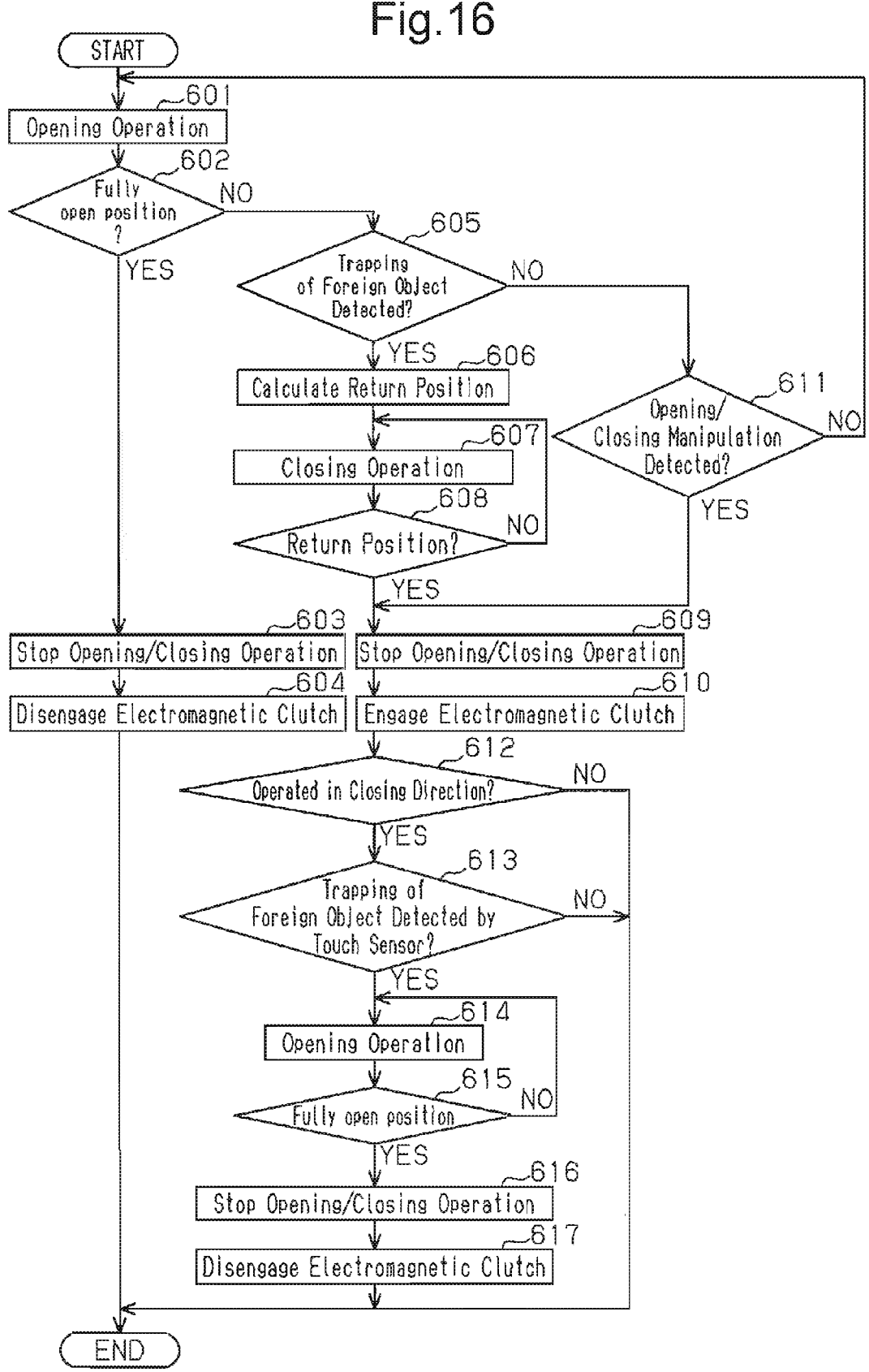
FIG. 16 is a flowchart illustrating a process for opening operation control of a fourth embodiment.
Figure 17:
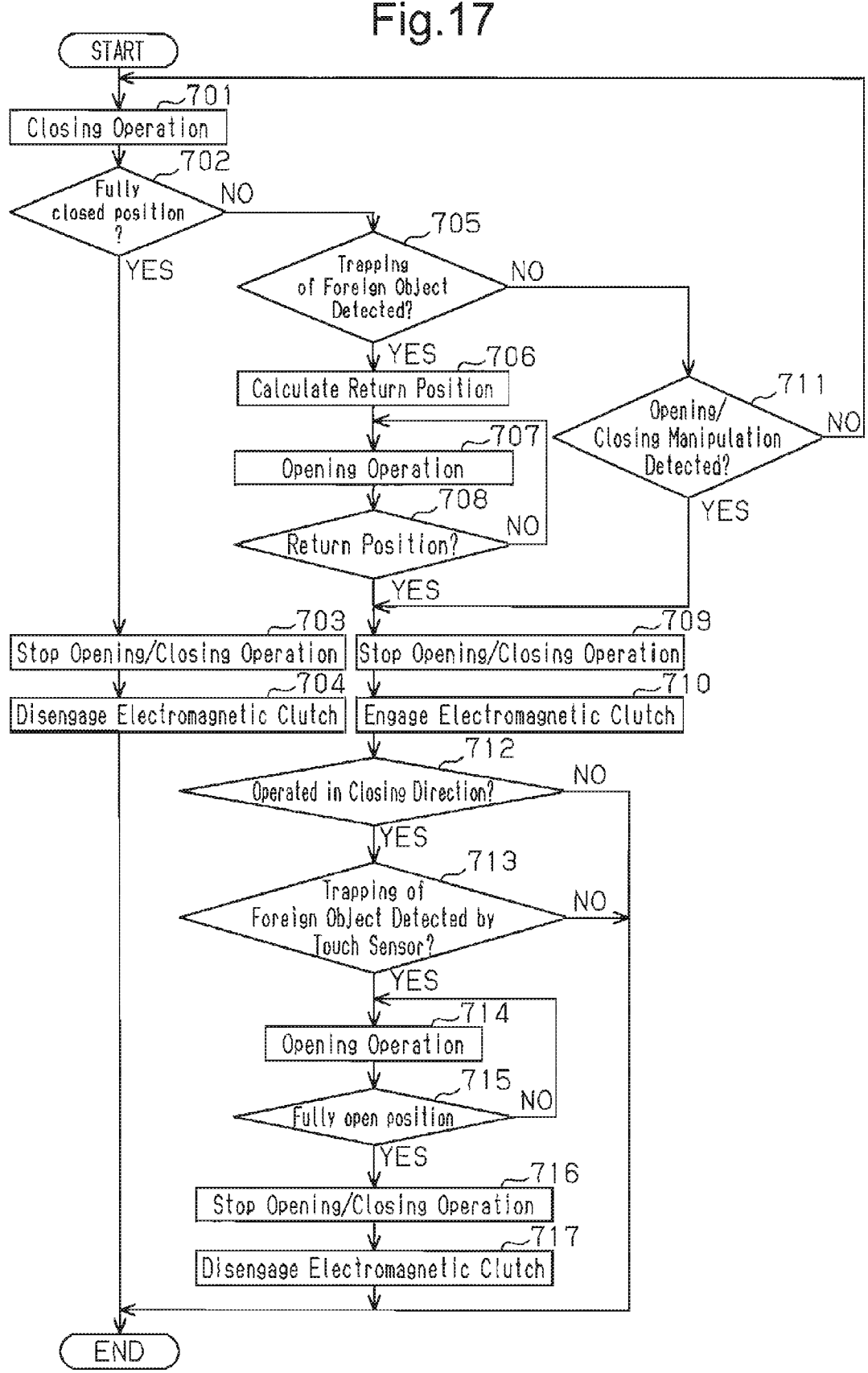
FIG. 17 is a flowchart illustrating a process for closing operation control of the fourth embodiment.

A fourth embodiment will hereafter be described with reference to the attached drawings. The fourth embodiment is configured identically to the above illustrated embodiments as shown in FIGS. 1 and 2 and executes the same slide door opening/closing control as the control of each of the embodiments as indicated in FIG. 4. The main difference between the fourth embodiment and the first embodiment is that the procedure of FIG. 16 is performed instead of the procedure of FIG. 5 and the procedure of FIG. 17 is performed instead of the procedure of FIG. 6. Therefore, for illustrative purposes, identical reference numerals are given to components of the fourth embodiment that are identical to corresponding components of the first embodiment and description of the components is omitted herein.

The background technique of the fourth embodiment will hereafter be described briefly.

Typically, an engagement/disengagement mechanism that selectively engages and disengages drive power transmission between the motor and the slide door, such as an electromagnetic clutch, is arranged in the opening/closing drive device. When the slide door is stopped at an intermediate position, the engagement/disengagement mechanism is maintained in an engaged state to hold the door position of the slide door at the intermediate position using the holding force produced by the holding torque (the cogging torque) of the motor. Therefore, if, for example, the vehicle is stopped on a steep slope and the component force applied to the slide door in the closing direction in correspondence with the weight of the slide door thus exceeds the aforementioned holding force, the slide door may move in the closing direction from the stopped state at the intermediate position disadvantageously.

However, conventional power slide devices are not addressed to such movement of the slide door from a stopped state at an intermediate position in a state in which no drive power is supplied to the motor, which is the drive source of the opening/closing device. Therefore, improvement of the power slide devices is demanded in this regard.

The fourth embodiment achieves such improvement.

If an opening/closing manipulation by the user is detected when the slide door 7 is being opened or being closed, the door ECU 23 controls operation of the opening/closing drive device 22 to stop the slide door 7 at the position at which the aforementioned manipulation is detected. When the slide door 7 is stopped in response to the detection of the opening/closing manipulation by the user, the door ECU 23 holds the door position of the slide door 7 at the intermediate position by maintaining the electromagnetic clutch 32 in an engaged state.

If, for example, the vehicle is stopped on a steep slope and the component force applied to the slide door 7 in the closing direction in correspondence with the weight of the slide door 7 exceeds the holding force produced by the holding torque of the slide motor 31, the slide door 7 may move in the closing direction from the stopped state at the intermediate position, thus causing trapping of a foreign object.

With this problem taken into consideration, the fourth embodiment cancels the trapping of the foreign object caused by the slide door 7 moving from the stopped state at the intermediate position. That is, if trapping of a foreign object is detected based on the detection current I, which is output by the touch sensor 46, when the slide door 7 moves in the closing direction from the stopped state at the intermediate position in a state in which no drive power is supplied to the slide motor 31, the door ECU 23 controls operation of the opening/closing drive device 22 to move the slide door 7 to the fully open position Po.

Also, for detection of trapping of a foreign object in a state in which no drive power is supplied to the slide motor 31, the door ECU 23 determines that trapping of a foreign object has occurred if the absolute value of the detection current I is maintained greater than the high-sensitivity trapping determination threshold value Ith1 continuously for the predetermined trapping determination period. The high-sensitivity trapping determination threshold value Ith1 is set as a value smaller than the aforementioned trapping determination threshold value Ith0.

That is, for a case in which the slide door 7 moves in the closing direction in a state in which no drive power is supplied to the slide motor 31, the door ECU 23 changes the detection condition for detecting trapping of a foreign object based on the detection current I such that a detection result that a foreign object is trapped is obtained easily compared to a case in which the opening/closing drive device 22 is driven to perform the closing operation of the slide door 7.

In contrast, if trapping of a foreign object is detected based on the operation velocity V of the slide door 7 when the closing operation of the slide door 7 is performed from a state in which the slide door 7 is stopped at an intermediate position in a state in which no drive power is supplied to the slide motor 31, the door ECU 23 maintains the slide motor 31 continuously in the state in which no drive power is supplied.

A process of opening operation control of the slide door by the door ECU will now be described.

With reference to the flowchart of FIG. 16, the door ECU 23 drives the opening/closing drive device 22 to perform the opening operation of the slide door 7 (Step 601) and determines whether the slide door 7 is located at the fully open position Po (Step 602). If it is determined that the slide door 7 is located at the fully open position Po (Step 602: YES), or, in other words, if the slide door 7 reaches the fully open position Po without trapping of a foreign object or an opening/closing manipulation by the user detected, the door ECU 23 stops the opening/closing operation of the slide door 7 by the opening/closing drive device 22 (Step 603) and switches the electromagnetic clutch 32 to a disengaged state (Step 604).

In contrast, when it is determined that the slide door 7 is not located at the fully open position Po (Step 602: NO), the door ECU 23 detects whether trapping of a foreign object by the slide door 7 has occurred (Step 605). Such detection of trapping of a foreign object based on the detection current I is carried out based on comparison between the levels of the detection current I and the trapping determination threshold value Ith0. If trapping of a foreign object is detected (Step 605: YES), the door ECU 23 calculates a return position at which the slide door 7 will be stopped after being reversed. The return position is spaced from the door position at which the trapping of a foreign object is detected by the predetermined closing-and-returning distance in the closing direction (Step 606). The door ECU 23 then performs the closing operation of the slide door 7 (Step 607) and determines whether the slide door 7 is located at the return position, which is calculated in Step 606 (Step 608). If the slide door 7 is located at the return position (Step 608: YES), the door ECU 23 stops the opening/closing operation of the slide door 7 by the opening/closing drive device 22 (Step 609) and switches the electromagnetic clutch 32 to the engaged state (Step 610). If the slide door 7 is not located at the return position (Step 608: NO), the door ECU 23 performs Step 607 to continue the closing operation and repeats the closing operation until the slide door 7 reaches the return position.

If trapping of a foreign object by the slide door 7 is not detected (Step 605: NO), the door ECU 23 detects whether an opening/closing manipulation by the user has occurred (Step 611). If an opening/closing manipulation is detected (Step 611: YES), the door ECU 23 performs Step 609 to stop the opening/closing operation of the slide door 7 by the opening/closing drive device 22 and then switches the electromagnetic clutch 32 to the engaged state. If an opening/closing manipulation is not detected (Step 611: NO), the door ECU 23 performs Step 601 to continue the closing operation.

The door ECU 23 then determines whether, after the slide door 7 is stopped at an intermediate position and the electromagnetic clutch 32 is switched to the engaged state in Step 610, the slide door 7 has moved in the closing direction in a state in which no drive power is supplied to the slide motor 31 (Step 612). If the slide door 7 has moved in the closing direction in a state in which no drive power is supplied to the slide motor 31 (Step 612: YES), the door ECU 23 detects whether trapping of a foreign object by the slide door 7 has occurred based on the detection current I, which is output by the touch sensor 46 (Step 613). Such detection of trapping of a foreign object is carried out based on comparison between the levels of the detection current I and the high-sensitivity trapping determination threshold value Ith1.

If trapping of a foreign object is detected based on the detection current I (Step 613: YES), the door ECU 23 drives the opening/closing drive device 22 to perform the opening operation of the slide door 7 (Step 614) and determines whether the slide door 7 is located at the fully open position Po (Step 615). If the slide door 7 is located at the fully open position Po (Step 615: YES), the door ECU 23 stops the opening/closing operation of the slide door 7 by the opening/closing drive device 22 (Step 616) and switches the electromagnetic clutch 32 to the disengaged state (Step 617). If the slide door 7 is not located at the fully open position Po (Step 615: NO), the door ECU 23 performs Step 614 to continue the opening operation and repeats the opening operation until the slide door 7 reaches the fully open position Po.

In contrast, if movement of the slide door 7 in the closing direction in a state in which no drive power is supplied to the slide motor 31 does not happen after the electromagnetic clutch 32 is switched to the engaged state (Step 612: NO), the door ECU 23 maintains the electromagnetic clutch 32 in the engaged state. Further, not only if detection of trapping of a foreign object based on the detection current I does not happen (Step 613: NO), or, in other words, if trapping of a foreign object does not occur, but also if trapping of a foreign object is detected based on the operation velocity V of the slide door 7, the door ECU 23 maintains the electromagnetic clutch 32 in the engaged state.

As has been described, the procedure of the opening operation control of the fourth embodiment, which is represented in FIG. 16, includes the same procedure (Steps 609 to 617) as the procedure of the third embodiment, which is represented in FIG. 13.

A procedure of the closing operation control of the slide door by the door ECU will hereafter be described.

As represented in the flowchart of FIG. 17, the door ECU 23 drives the opening/closing drive device 22 to perform the closing operation of the slide door 7 (Step 701) and determines whether the slide door 7 is located at the fully closed position Pc (Step 702). If it is determined that the slide door 7 is located at the fully closed position Pc (Step 702: YES), or, in other words, if the slide door 7 is moved to the fully closed position Pc without detecting trapping of a foreign object or an opening/closing manipulation by the user, the door ECU 23 stops the opening/closing operation of the slide door 7 by the opening/closing drive device 22 (Step 703) and switches the electromagnetic clutch 32 to the engaged state (Step 704).

In contrast, if it is determined that the slide door 7 is not located at the fully closed position Pc (Step 702: NO), the door ECU 23 detects whether trapping of a foreign object by the slide door 7 has occurred (Step 705). If trapping of a foreign object is detected (Step 705: YES), the door ECU 23 calculates a return position at which the slide door 7 will be stopped after being reversed. The return position is spaced from the door position at which the trapping of a foreign object is detected by the predetermined opening-and-returning distance in the closing direction (Step 706). The door ECU 23 then reverses the slide door 7 to perform the opening operation (Step 707) and determines whether the slide door 7 is located at the return position, which is calculated in Step 706 (Step 708). If the slide door 7 is located at the return position (Step 708: YES), the door ECU 23 stops the opening/closing operation of the slide door 7 by the opening/closing drive device 22 (Step 709) and switches the electromagnetic clutch 32 to the engaged state (Step 710). If the slide door 7 is not located at the return position (Step 708: NO), the door ECU 23 performs Step 707 to continue the opening operation and repeats the opening operation until the slide door 7 reaches the return position.

If trapping of a foreign object by the slide door 7 is not detected (Step 705: NO), the door ECU 23 detects whether an opening/closing manipulation by the user has occurred (Step 711). If an opening/closing manipulation is detected (Step 711: YES), the door ECU 23 performs Step 709 to stop the opening/closing operation of the slide door 7 by the opening/closing drive device 22 and then switches the electromagnetic clutch 32 to the engaged state. If an opening/closing manipulation is not detected (Step 711: NO), the door ECU 23 performs Step 701 to continue the closing operation.

Then, after stopping the slide door 7 at an intermediate position and switching the electromagnetic clutch 32 to the engaged state in Step 710, the door ECU 23 performs the procedure by the same steps as Steps 612 to 617 of the above-described opening operation control (Step 712 to Step 717).

As has been described, the procedure of the closing operation control of the fourth embodiment, which is represented in FIG. 17, includes the same procedure (Step 709 to 717) as the procedure of the third embodiment, which is represented in FIG. 13.

Operation of the fourth embodiment will now be described.

As illustrated in FIGS. 14A and 14B, when, for example, the vehicle is stopped on a steep slope to allow the user to exit/enter the vehicle with the slide door 7 stopped at an intermediate position, the slide door 7 may move in the closing direction due to the weight of the slide door 7. With reference to FIG. 14A, if, for example, the user is trapped and the trapping is detected based on the detection current I of the touch sensor 46, the door ECU 23 drives the opening/closing drive device 22 to move the slide door 7 to the fully open position Po. The slide door 7 is thus held at the fully open position Po by the fully opening lock 12. This allows the user to easily exit/enter the vehicle.

As illustrated in FIG. 14B, when, for example, the user notices that the slide door 7 is moving in the closing direction due to the weight of the slide door 7 and manually stops the slide door 7, the door ECU 23 maintains the slide motor 31 continuously in the state in which no drive power is supplied even if trapping of a foreign object is detected based on the operation velocity V of the slide door 7. The slide door 7 is thus stopped continuously at the current door position and discomfort for the user is reduced.

Referring to FIG. 14C, if trapping of a foreign object is detected based on either the detection current I of the touch sensor 46 or the operation velocity V of the slide door 7 when the opening/closing drive device 22 is driven to perform the closing operation of the slide door 7, the door ECU 23 performs the opening operation of the slide door 7 by the predetermined opening-and-returning distance and then stops the slide door 7. This cancels the trapping of the foreign object and restrains re-trapping of the same foreign object by the slide door 7 after the slide door 7 is reversed.

As has been described, the fourth embodiment has the same operation as the third embodiment.

Further, the fourth embodiment has the same advantages as the advantages (11) to (14) of the third embodiment and, therefore, description of these advantages is omitted herein.

The above illustrated embodiment may be modified as follows.

In the first embodiment, if trapping of a foreign object is detected when the slide door 7 is being opened and is located in the first specified range, the slide door 7 is reversed and moved to the fully closed position Pc.

Alternatively, after the closing operation is performed by the predetermined closing-and-returning distance, for example, the slide door 7 may be stopped regardless of whether the slide door 7 reaches the fully closed position Pc.

In the first embodiment, if trapping of a foreign object is detected when the slide door 7 is being closed and is located in the first specified range, the opening operation of the slide door 7 is performed by at least the predetermined opening-and-returning distance or a greater distance such that the slide door 7 is located outside the first specified range through the opening operation and then the slide door 7 is stopped. Alternatively, the slide door 7 may be stopped in the first specified range if an opening operation of the slide door 7 is performed by at least the predetermined opening-and-returning distance or a greater distance.

In the first embodiment, even if an opening/closing manipulation is detected when the slide door 7 is being opened and is located in the second specified range, the opening operation of the slide door 7 is continued. Alternatively, when the opening/closing manipulation is detected, the slide door 7 may be reversed to perform the closing operation.

In the first embodiment, even if a closing manipulation is detected when the slide door 7 is being closed and is located in the second specified range, the closing operation of the slide door 7 is continued. Alternatively, when the closing manipulation is detected, the slide door 7 may be reversed to perform the opening operation.

In the first embodiment, if an opening manipulation is detected when the slide door 7 is being closed and is located in the second specified range, the slide door 7 is reversed to perform the opening operation and thus moved to the fully open position Po before being stopped. Alternatively, the slide door 7 may be stopped after being moved to, for example, the first specified position P1. Also, without reversing the slide door 7, the closing operation of the slide door 7 may be continued.

In the first embodiment, even if an opening/closing manipulation is detected when the slide door 7 is located in the second specified range, the slide door 7 is not stopped at the door position at which the manipulation is detected. Alternatively, the slide door 7 may be stopped in the second specified range.

In the first embodiment, if the position at which an opening/closing manipulation by the user is detected is outside the second specified range when the opening operation or the closing operation is performed, the slide door 7 is stopped at the door position at which the manipulation is detected. In the second, third, and fourth embodiments, if an opening/closing manipulation by the user is detected when the opening operation or the closing operation of the slide door 7 is performed, the slide door 7 is stopped at the door position at which the manipulation is detected.

Alternatively, in the first to fourth embodiments, the slide door 7 may be stopped after being reversed by a predetermined distance from the door position at which the manipulation is detected. Also, in the first to fourth embodiments, even if an opening/closing manipulation by the user is detected, the opening operation or the closing operation may be continued without stopping the slide door 7.

In the first embodiment, if the door position at which trapping of a foreign object is detected is outside the first specified range when the opening operation or the closing operation is performed, the slide door 7 is reversed by the predetermined distance and then stopped. In the second embodiment, if the door position at which trapping of a foreign object is detected is outside the reverse prohibiting range, the slide door 7 is reversed by the predetermined distance and then stopped. In the third and fourth embodiments, if trapping of a foreign object is detected when the opening operation or the closing operation is performed, the slide door 7 is stopped.

Alternatively, in the first, third, and fourth embodiments, when trapping of a foreign object is detected, the slide door 7 may be moved to, for example, either the fully open position Po or the fully closed position Pc. In the first, third, and fourth embodiments, the slide door 7 may be stopped at the door position at which the trapping of the foreign object is detected. Also, in the second embodiment, if the door position at which the trapping of the foreign object is detected is outside the reverse prohibiting range, the slide door 7 may be, for example, moved to either the fully open position Po or the fully closed position Pc or stopped at the door position at which the trapping of the foreign object is detected.

In the first, third, and fourth embodiments, even if the slide door 7 moves in the closing direction from a state located in the fully open range and passes the assumed fully open position Po', the closing operation control does not necessarily need to be executed unless an opening/closing manipulation by the user is detected.

In the first embodiment, the first specified position P1 is set such that the first specified position P1 is shifted in the closing direction from the middle position Pm and shifted in the opening direction from the half-latch position Ph and that the distance of the first specified range as a whole is greater than both the closing-and-returning distance and the opening-and-returning distance. Alternatively, the first specified position P1 may be set at any other suitable position as long as the position is shifted in the closing direction from the middle position Pm and in the opening direction from the half-latch position Ph. Also, the second specified position P2 does not necessarily have to coincide with the half-latch position Ph but may be set at any other suitable position as long as the position is shifted in the closing direction from the first specified position P1.

In the second embodiment, the reverse prohibiting position Pp is set at the position spaced from the assumed fully open position Po' by a distance greater than the predetermined opening-and-returning distance in the closing direction. Alternatively, the reverse prohibiting position Pp may be set such that the distance from the assumed fully open position Po' to the reverse prohibiting position Pp becomes smaller than or equal to the predetermined opening-and-returning distance.

In the second embodiment, if the door position of the slide door 7 at which trapping of a foreign object is detected is in the reverse prohibiting range when the slide door 7 is being closed, the electromagnetic clutch 32 is intermittently switched to the engaged state. Alternatively, the electromagnetic clutch 32 may be switched continuously to either the engaged state or the disengaged state.

In the third and fourth embodiments, if trapping of a foreign object is detected based on the operation velocity V of the slide door 7 when the slide door 7 moves in the closing direction from a stopped state at an intermediate position in a state in which no drive power is supplied to the slide motor 31, the slide door 7 may be moved to the fully open position Po.

In the third and fourth embodiments, for detection of trapping of a foreign object when the slide door 7 moves in the closing direction in a state in which no drive power is supplied to the slide motor 31, it is determined that trapping of a foreign object has occurred if the detection current I is maintained greater than the high-sensitivity trapping determination threshold value Ith1 continuously for the predetermined trapping determination period. Alternatively, for detection of trapping of a foreign object in the aforementioned case, the detection condition may be changed in any other suitable manner such that a detection result that a foreign object is trapped is obtained easily compared to a case in which the opening/closing drive device 22 is driven to perform the closing operation of the slide door 7. Specifically, for example, for when the slide door 7 moves in the closing direction in a state in which no drive power is supplied to the slide motor 31, the predetermined trapping determination period may be shortened or the detection current I, which is used for determination, may be set to a value greater than the actually detected value.

The detection condition for a case in which the slide motor 7 moves in the closing direction from a stopped state at an intermediate position in a state in which no drive power is supplied to the slide motor 31 may be the same as the detection condition for a case in which the opening/closing drive device 22 is driven to perform the closing operation of the slide door 7.

In the third and fourth embodiments, the door ECU 23 performs control responding to a case in which the slide door 7 moves in the closing direction from a stopped state at an intermediate position in a state in which no drive power is supplied to the slide motor 31. Alternatively, the door ECU 23 may execute control responding to a case in which the slide door 7 moves in the opening direction from a stopped state at an intermediate position in a state in which no drive power is supplied to the slide motor 31. Specifically, if trapping of a foreign object is detected when the slide door 7 moves in the opening direction from a stopped state at an intermediate position in a state in which no drive power is supplied to the slide motor 31, the slide door 7 may be moved to the fully closed position Pc.

In the above illustrated embodiments, the door ECU 23 acknowledges a trigger signal that is input through a switch, such as the handle switch 42, as a manipulation signal in the direction opposite to the direction in which the slide door 7 has been operated immediately before the trigger signal is input. Alternatively, the trigger signal may be acknowledged as the manipulation signal in the direction opposite to the direction in which the slide door 7 has been operated immediately before the trigger signal is input only when the slide door 7 is located at either the fully open position Po or the fully closed position Pc. In this case, if the slide door 7 is located at an intermediate position, the trigger signal may be acknowledged as a manipulation signal in the same direction as the direction in which the slide door 7 has been operated immediately before the trigger signal is input. In this manner, when, for example, the slide door 7 is stopped at an intermediate position while being closed, the user is allowed to continue the closing operation of the slide door 7 by re-manipulating the door handle 14.

In this configuration, if the trigger signal is input when the slide door 7 is in the closing operation and is located in the second specified range, it is preferable that the door ECU 23 reverse the slide door 7 to perform the opening operation, as illustrated in FIG. 8E, by acknowledging the trigger signal not as the closing manipulation signal but as the opening manipulation signal.

In the above illustrated embodiments, the power slide door device 21, serving as the opening/closing manipulation detector that detects an opening/closing manipulation by the user, has the driver's seat switch 41, the handle switch 42, the pillar switch 43, and the portable device switch 44a. Alternatively, the power slide door device 21 may be configured either without the pillar switch 43, for example, or with any other suitable switch.

Although the predetermined closing-and-returning distance and the predetermined opening-and-returning distance are set as equal distances in each of the above illustrated embodiments, the closing-and-returning distance and the opening-and-returning distance may be set as different distances.

In the above illustrated embodiments, as the fully opening lock 12, a configuration in which each roller 6 rides over a projection (not shown), which is arranged in the corresponding rail 3 to 5, and thus holds the slide door 7 at the fully open position Po may be employed. In this case, movement of the slide door 7 in the closing direction from the fully open position Po is permitted by applying the force necessary for the rollers 6 to ride over the corresponding projections to the slide door 7.

In the above illustrated embodiments, the electromagnetic clutch 32 is employed as the engagement/disengagement mechanism that selectively engages and disengages drive power transmission between the slide motor 31 and the slide door 7. Alternatively, a mechanical clutch may be used, for example.

In the first and second embodiments, the opening/closing drive device 22 may be configured without an engagement/disengagement mechanism such as an electromagnetic clutch.

In the above illustrated embodiments, trapping of a foreign object is detected based on the detection current I, which is output by the touch sensor 46. Alternatively, the touch sensor 46 may be adapted, for example, to output detection voltage corresponding to contact pressure and the trapping of the foreign object may be detected based on the detection pressure. Also, as the touch sensor 46, a configuration in which a pair of electrodes are arranged on opposite sides of a piezoelectric material or any other suitable configuration may be employed.

In the above illustrated embodiments, detection whether the slide door 7 is in a stopped state (whether trapping of a foreign object has occurred) is carried out based on the operation velocity V of the slide door 7. Alternatively, detection whether the slide door 7 is in a stopped state may be carried out based on, for example, the motor current supplied to the slide motor 31.

In the above illustrated embodiments, the door position (the operation velocity V) of the slide door 7 is detected by counting the number of pulses in each pulse signal output by the pulse sensor 33. Alternatively, the door position (the operation velocity V) of the slide door 7 may be detected by, for example, detecting the absolute angle of the slide motor 31. Also, the door position may be detected directly using, for example, a displacement sensor.

In the above illustrated embodiments, the opening/closing drive device 22 has the slide actuator 25, the closer actuator 26, and the release actuator 27. Alternatively, the closer actuator 26 may be omitted, for example, and the slide actuator 25 may move the slide door 7 to the fully closed position Pc from an ajar state.

In the first, third, and fourth embodiments, control for restraining consecutive repetition of the closing operation and the opening operation of the opening/closing body of the second embodiment may be executed additionally.

In the first embodiment, control for reducing false perceptions by the user that the slide door 7 is located at the fully closed position is employed on the power slide door device 21, which selectively opens and closes the slide door 7. However, such control for reducing the false perceptions by the user that the opening/closing body is located at the fully closed position may be employed on any other suitable vehicle opening/closing body control device that selectively opens and closes any suitable opening/closing body other than the slide door 7, such as a back door or a luggage door or a trunk lid arranged in a vehicle rear section. Also, the control of the second embodiment for restraining consecutive repetition of the closing operation and the opening operation of the opening/closing body may be employed on any other suitable vehicle opening/closing body control device that selectively opens and closes any suitable opening/closing body other than the slide door 7. Alternatively, the control of the third and fourth embodiments for canceling trapping of a foreign object caused by movement of the opening/closing body from a stopped state at an intermediate position may be employed on the aforementioned suitable vehicle opening/closing body control device.

Technical ideas obtainable from the above illustrated embodiments and modifications will hereafter be described.

(1) A vehicle opening/closing body control device comprising:

an opening/closing drive device, which performs opening/closing operation of an opening/closing body of a vehicle;

an opening/closing body position detector, which detects a position of the opening/closing body;

a trapping detector, which detects trapping of a foreign object by the opening/closing body; and a controller, which controls operation of the opening/closing drive device, wherein, when the opening/closing body is being opened, if the position of the opening/closing body when the trapping of the foreign object is detected is outside a specified range between a fully closed position and a specified position shifted in an opening direction from the fully closed position, the controller controls the operation of the opening/closing drive device to reverse the opening/closing body to perform closing operation by a predetermined closing-and-returning distance and then stop the opening/closing body, and if the position of the opening/closing body when the trapping of the foreign object is detected is in the specified range, the controller controls the operation of the opening/closing drive device to reverse and move the opening/closing body to the fully closed position.

(2) A vehicle opening/closing body control device comprising:

an opening/closing drive device, which opens/closes an opening/closing body of a vehicle;

a fully closing lock, which holds the opening/closing body at a fully closed position;

an opening/closing body position detector, which detects a position of the opening/closing body;

a trapping detector, which detects trapping of a foreign object by the opening/closing body; and a controller, which controls operation of the opening/closing drive device, wherein an engagement/disengagement mechanism, which selectively engages and disengages drive power transmission between a motor serving as a drive source of the opening/closing drive device and the opening/closing body, is arranged in the opening/closing drive device, and if the trapping of the foreign object is detected when the opening/closing body moves in a state in which no drive power is supplied to the motor in an opening direction from a state in which the opening/closing body is stopped at an intermediate position in an operation range of the opening/closing body with the engagement/disengagement mechanism in an engaged state, in which the drive power transmission between the motor and the opening/closing body is permitted, the controller controls the operation of the opening/closing drive device to move the opening/closing body to the fully closed position.

DESCRIPTION OF THE REFERENCE NUMERALS

7 . . . slide door (opening/closing body), 11 . . . fully closing lock, 12 . . . fully opening lock, 14 . . . door handle, 20 . . . vehicle opening/closing system, 21 . . . power slide door device (vehicle opening/closing body control device), 22 . . . opening/closing drive device, 23 . . . door ECU (controller, trapping detector, speed detector), 24 . . . in-vehicle power source, 31 . . . slide motor (motor), 32 . . . electromagnetic clutch (engagement/disengagement mechanism), 33 . . . pulse sensor (trapping detector, speed detector), 41 . . . driver's seat switch (opening/closing manipulation detector), 42 . . . handle switch (opening/closing manipulation detector), 43 . . . pillar switch (opening/closing manipulation detector), 44 . . . portable device, 44a . . . portable device switch (opening/closing manipulation detector), 45 . . . receiver ECU, 46 . . . touch sensor (trapping detector), I . . . detection current, P1 . . . first specified position (specified position), P2 . . . second specified position, Pc . . . fully closed position, Po . . . fully open position, Pp . . . reverse prohibiting position, V . . . operation velocity, W . . . foreign object

The invention claimed is:

1. A vehicle opening and closing body control device comprising:

an opening and closing drive device, which performs opening and closing operation of an opening and closing body of a vehicle;

an opening and closing body position detector, which detects a position of the opening and closing body;

a trapping detector, which detects a trapping of a foreign object by the opening and closing body; and a controller, which controls operation of the opening and closing drive device, wherein, when the opening and closing body is being closed, in a case where the position of the opening and closing body when the trapping of the foreign object is detected is outside a specified range between a fully closed position and a specified position, which is shifted in an opening direction from the fully closed position, the controller controls the operation of the opening and closing drive device to reverse the opening and closing body to perform the opening operation by a predetermined opening-and-returning distance and then stop the opening and closing body, and in a case where the position of the opening and closing body when the trapping of the foreign object is detected is in the specified range, the controller controls the operation of the opening and closing drive device to reverse the opening and closing body to perform the opening operation by the predetermined opening-and-returning distance or a greater distance and then stop the opening and closing body outside the specified range.

2. The vehicle opening and closing body control device according to claim 1, further comprising:

a fully opening lock, which holds the opening and closing body at a fully open position; and an engagement and disengagement mechanism arranged in the opening and closing drive device to selectively engage and disengage drive power transmission between a motor serving as a drive source of the opening and closing drive device and the opening and closing body, wherein, in a case where a trapping of a foreign object is detected when the opening and closing body moves in the closing direction without drive power supplied to the motor from a state in which the opening and closing body is stopped at an intermediate position in an operation range of the opening and closing body with the engagement and disengagement mechanism in an engaged state, in which the power drive transmission between the motor and the opening and closing body is permitted, the controller controls the operation of the opening and closing drive device to move the opening and closing body to the fully open position.

3. The vehicle opening and closing body control device according to claim 1, wherein, when the opening and closing body is being opened, in a case where the position of the opening and closing body when the trapping of the foreign object is detected is outside the specified range, the controller controls the operation of the opening and closing drive device to reverse the opening and closing body to perform the closing operation by a predetermined closing-and-returning distance and then stop the opening and closing body, and in a case where the position of the opening and closing body when the trapping of the foreign object is detected is in the specified range, the controller controls the operation of the opening and closing drive device to reverse and move the opening and closing body to the fully closed position.

4. The vehicle opening and closing body control device according to claim 1, comprising an opening and closing manipulation detector, which detects an opening and closing manipulation for driving the opening and closing drive device to perform the opening and closing operation of the opening and closing body, wherein, when the opening and closing body is being opened or closed, in a case where the position of the opening and closing body when the opening and closing manipulation is detected is outside a second specified range between the fully closed position and a second specified position, which is shifted in the closing direction from the specified position, the controller controls the operation of the opening and closing drive device to stop the opening and closing body at an intermediate position in an operation range of the opening and closing body, and in a case where the position of the opening and closing body when the opening and closing manipulation is detected is in the second specified range, the controller controls the operation of the opening and closing drive device not to stop the opening and closing body at the position of the opening and closing body.

5. The vehicle opening and closing body control device according to claim 4, wherein, when the opening and closing body is being opened, the controller controls the operation of the opening and closing drive device to continue the opening operation of the opening and closing body in a case where the position of the opening and closing body when the opening and closing manipulation is detected is in the second specified range.

6. The vehicle opening and closing body control device according to claim 4, wherein, when the opening and closing body is being closed, in a case where the position of the opening and closing body when the opening and closing manipulation for performing the opening operation of the opening and closing body is detected is in the second specified range, the controller controls the operation of the opening and closing drive device to reverse the opening and closing body to perform the opening operation, and in a case where the position of the opening and closing body when the opening and closing manipulation for performing the closing operation of the opening and closing body is in the second specified range, the controller controls the operation of the opening and closing drive device to continue the closing operation of the opening and closing body.

7. The vehicle opening and closing body control device according to claim 1, further comprising a fully opening lock, which holds the opening and closing body at a fully open position, wherein when the opening and closing body is being opened, in a case where it is determined that the opening and closing body enters a stopped state in a fully open range between the fully open position and an assumed fully open position, which is shifted in the closing direction from the fully open position, the controller stops the opening and closing operation of the opening and closing body by the opening and closing drive device, and in a case where the opening and closing body moves in the closing direction from inside the fully open range and passes the assumed fully open position, the controller drives the opening and closing drive device to perform the closing operation of the opening and closing body, and when the opening and closing body is being closed, in a case where the position of the opening and closing body when the trapping of the foreign object is detected is in a reverse prohibiting range between the fully open position and a reverse prohibiting position, which is shifted in the closing direction from the assumed fully open position, the controller controls the operation of the opening and closing drive device to prevent the opening and closing body from being reversed and performing the opening operation.

8. A vehicle opening and closing body control device comprising:

an opening and closing drive device, which performs an opening and closing operation of an opening and closing body of a vehicle;

a fully opening lock, which holds the opening and closing body at a fully open position;

an opening and closing body position detector, which detects a position of the opening and closing body;

a trapping detector, which detects a trapping of a foreign object by the opening and closing body; and a controller, wherein when the opening and closing body is being opened, in a case where it is determined that the opening and closing body enters a stopped state in a fully open range between the fully open position and an assumed fully open position, which is shifted in the closing direction from the fully open position, the controller stops the opening and closing operation of the opening and closing body by the opening and closing drive device, and in a case where the opening and closing body moves in the closing direction from inside the fully open range and passes the assumed fully open position, the controller drives the opening and closing drive device to perform the closing operation of the opening and closing body, and when the opening and closing body is being closed, in a case where the position of the opening and closing body when the trapping of the foreign object is detected is in a reverse prohibiting range between the fully open position and a reverse prohibiting position, which is shifted in the closing direction from the assumed fully open position, the controller controls the operation of the opening and closing drive device to prevent the opening and closing body from being reversed and performing the opening operation.

9. The vehicle opening and closing body control device according to claim 8, wherein when the opening and closing body is being closed, in a case where the position of the opening and closing body when the trapping of the foreign object is detected is outside the reverse prohibiting range, the controller controls the operation of the opening and closing drive device to reverse the opening and closing body to perform the opening operation by a predetermined opening-and-returning distance and then stop the opening and closing body, and the reverse prohibiting position is set at a position spaced from the assumed fully open position by a distance greater than the predetermined opening-and-returning distance in the closing direction.

10. The vehicle opening and closing body control device according to claim 8, wherein an engagement and disengagement mechanism, which selectively engages and disengages drive power transmission between a motor serving as a drive source of the opening and closing drive device and the opening and closing body, is arranged in the opening and closing drive device, and when the opening and closing body is being closed, in a case where the position of the opening and closing body when the trapping of the foreign object is detected is in the reverse prohibiting range, the controller stops the opening and closing operation of the opening and closing body by the opening and closing drive device and intermittently switches the engagement and disengagement mechanism to a disengaged state, in which the drive power transmission between the motor and the opening and closing body is disengaged.

11. A vehicle opening and closing body control device comprising:

an opening and closing drive device, which performs an opening and closing operation of an opening and closing body of a vehicle;

a fully opening lock, which holds the opening and closing body at a fully open position;

an opening and closing body position detector, which detects a position of the opening and closing body;

a trapping detector, which detects a trapping of a foreign object by the opening and closing body;

an engagement and disengagement mechanism arranged in the opening and closing drive device to selectively engage and disengage drive power transmission between a motor serving as a drive source of the opening and closing drive device and the opening and closing body; and a controller, which controls operation of the opening and closing drive device, wherein, in a case where a trapping of a foreign object is detected when the opening and closing body moves in the closing direction without drive power supplied to the motor from a state in which the opening and closing body is stopped at an intermediate position in an operation range of the opening and closing body with the engagement and disengagement mechanism in an engaged state, in which the power drive transmission between the motor and the opening and closing body is permitted, the controller controls the operation of the opening and closing drive device to move the opening and closing body to the fully open position.

12. The vehicle opening and closing body control device according to claim 11, wherein, in a case where the trapping of the foreign object is detected when the opening and closing drive device is driven to perform the closing operation of the opening and closing body, the controller controls the operation of the opening and closing drive device to reverse the opening and closing body to perform the opening operation by a predetermined opening-and-returning distance and then stop the opening and closing body.

13. The vehicle opening and closing body control device according to claim 11, wherein the trapping detector includes a touch sensor, which outputs a detection signal corresponding to contact pressure and a speed detector, which detects an operation velocity of the opening and closing body, and when the opening and closing body moves in the closing direction in a state in which no drive power is supplied to the motor from the stopped state at the intermediate position, in a case where the trapping of the foreign object is detected based on the detection signal, the controller controls the operation of the opening and closing drive device to move the opening and closing body to the fully open position, and in a case where the trapping of the foreign object is detected based on the operation velocity, the controller maintains the state in which no drive power is supplied to the motor.

14. The vehicle opening and closing body control device according to claim 13, wherein, when the opening and closing body moves in the closing direction from the stopped state at the intermediate position in the state in which no drive power is supplied to the motor, the controller changes a detection condition for detecting a trapping of an object based on the detection signal such that a detection result that a foreign object is trapped is easily obtained in comparison with a case in which the opening and closing drive device is driven to perform the closing operation of the opening and closing body.

15. A vehicle opening and closing system comprising a vehicle opening and closing body control device, wherein the vehicle opening and closing body control device includes:

an opening and closing drive device, which performs opening and closing operation of an opening and closing body of a vehicle;

an opening and closing body position detector, which detects a position of the opening and closing body;

a trapping detector, which detects a trapping of a foreign object by the opening and closing body; and a controller, which controls operation of the opening and closing drive device, wherein, when the opening and closing body is being closed, in a case where the position of the opening and closing body when the trapping of the foreign object is detected is outside a specified range between a fully closed position and a specified position, which is shifted in an opening direction from the fully closed position, the controller controls the operation of the opening and closing drive device to reverse the opening and closing body to perform the opening operation by a predetermined opening-and-returning distance and then stop the opening and closing body, and in a case where the position of the opening and closing body when the trapping of the foreign object is detected is in the specified range, the controller controls the operation of the opening and closing drive device to reverse the opening and closing body to perform the opening operation by the predetermined opening-and-returning distance or a greater distance and then stop the opening and closing body outside the specified range.

\* \* \* \* \*